(12) United States Patent
Andersson et al.

(10) Patent No.: US 10,918,549 B2
(45) Date of Patent: Feb. 16, 2021

(54) PERSON LIFT DEVICES AND SCALE ASSEMBLIES FOR PERSON LIFT DEVICES INCLUDING ACCESSORY TRACKING FEATURES

(71) Applicant: Liko Research & Development AB, Luleå (SE)

(72) Inventors: Mattias Andersson, Södra Sunderbyn (SE); Andreas Bolin, Gammelstad (SE); Marica Demby, Luleå (SE); Peter Rydstrom, Gammelstad (SE); Douglas A. Seim, Okeana, OH (US)

(73) Assignee: LIKO RESEARCH & DEVELOPMENT AB, Luleå (SE)

( * ) Notice: Subject to any disclaimer, the term of this patent is extended or adjusted under 35 U.S.C. 154(b) by 0 days.

(21) Appl. No.: 16/454,718

(22) Filed: Jun. 27, 2019

(65) Prior Publication Data

US 2019/0314234 A1 Oct. 17, 2019

Related U.S. Application Data

(62) Division of application No. 15/213,968, filed on Jul. 19, 2016, now Pat. No. 10,376,434.

(Continued)

(51) Int. Cl.
*A61G 7/10* (2006.01)
*G01G 19/44* (2006.01)
*G01G 19/52* (2006.01)

(52) U.S. Cl.
CPC ........... *A61G 7/108* (2013.01); *A61G 7/1017* (2013.01); *A61G 7/1046* (2013.01);
(Continued)

(58) Field of Classification Search
CPC ........ G01G 19/14; G01G 19/18; G01G 19/44; G01G 19/52; A61G 2203/32;
(Continued)

(56) References Cited

U.S. PATENT DOCUMENTS 3,517,761 A * 6/1970 Wigman ................... B66C 1/40
177/147
3,517,762 A * 6/1970 Hedger .................. G01G 23/00
177/153
(Continued)

FOREIGN PATENT DOCUMENTS

EP 2684549 A2 1/2014
EP 2727571 A2 7/2014
(Continued)

OTHER PUBLICATIONS

Unirope Ltd; RFID Tags; [retrieved online on Jul. 11, 2013], http://www.unirope.com/chainmeshslings/rfid_tags.shtml. pp. 1-2.
(Continued)

*Primary Examiner* — Natalie Huls
(74) *Attorney, Agent, or Firm* — Dinsmore & Shohl, LLP

(57) ABSTRACT

In the embodiments described herein, the scale assembly automatically determines if an accessory, such as a sling, is properly connected to a sling bar of the person lifting device and, if the accessory is not properly connected, the scale assembly provides a user with a visual and/or audible warning and, in some embodiments, may lock-out the actuation controls of the person lifting device to prevent the person lifting device from being used.

14 Claims, 15 Drawing Sheets

Related U.S. Application Data

(60) Provisional application No. 62/199,603, filed on Jul. 31, 2015.

(52) U.S. Cl.
CPC ......... *A61G 7/1051* (2013.01); *A61G 7/1061* (2013.01); *A61G 7/1065* (2013.01); *G01G 19/44* (2013.01); *G01G 19/52* (2013.01); *A61G 2203/32* (2013.01); *A61G 2205/60* (2013.01)

(58) Field of Classification Search
CPC .............. A61G 2205/60; A61G 7/1017; A61G 7/1046; A61G 7/1051; A61G 7/1061; A61G 7/1065; A61G 7/108
See application file for complete search history.

(56) References Cited

U.S. PATENT DOCUMENTS

| | | | |
|---|---|---|---|
| 3,910,365 A * | 10/1975 | Buchele | G01G 23/14 177/165 |
| 4,475,610 A * | 10/1984 | Schwarzschild | G01G 3/1402 177/211 |
| 4,944,056 A | 7/1990 | Schroeder et al. | |
| 5,072,798 A * | 12/1991 | Franklin | G01G 19/18 177/147 |
| 5,511,256 A * | 4/1996 | Capaldi | A61G 7/1015 403/217 |
| 6,289,534 B1 | 9/2001 | Hakamiun et al. | |
| 6,523,195 B1 | 2/2003 | Rodier et al. | |
| 6,528,739 B1 * | 3/2003 | Nowosielski | G01G 19/14 177/225 |
| 7,240,621 B2 | 7/2007 | Chepurny et al. | |
| 8,538,710 B2 | 9/2013 | Todd et al. | |
| 8,910,325 B2 * | 12/2014 | Faucher | A61G 7/1042 212/278 |
| 9,000,311 B1 * | 4/2015 | Collins | B66C 1/40 177/132 |
| 2002/0138905 A1 | 10/2002 | Bartlett et al. | |
| 2004/0238230 A1 * | 12/2004 | Petrotto | G01G 19/18 177/144 |
| 2009/0049610 A1 | 2/2009 | Heimbrock et al. | |
| 2009/0307840 A1 | 12/2009 | Lingegard | |
| 2010/0001838 A1 | 1/2010 | Miodownik et al. | |
| 2010/0097181 A1 | 4/2010 | Sorensen et al. | |
| 2010/0192296 A1 | 8/2010 | Clough | |
| 2010/0217618 A1 | 8/2010 | Piccirillo et al. | |
| 2010/0224841 A1 * | 9/2010 | Liljedahl | B66C 23/48 254/120 |
| 2011/0035058 A1 | 2/2011 | Clough | |
| 2011/0301440 A1 | 12/2011 | Riley et al. | |
| 2012/0095777 A1 | 4/2012 | Chang et al. | |
| 2013/0019401 A1 | 1/2013 | Faucher et al. | |
| 2013/0076517 A1 | 3/2013 | Penninger et al. | |
| 2013/0091631 A1 | 4/2013 | Hayes et al. | |
| 2013/0205501 A1 | 8/2013 | Robertson et al. | |
| 2013/0253291 A1 | 9/2013 | Dixon et al. | |
| 2013/0319775 A1 | 12/2013 | Ngoh et al. | |
| 2014/0013503 A1 | 1/2014 | Dixon et al. | |
| 2014/0020175 A1 | 1/2014 | Dixon et al. | |
| 2014/0115778 A1 | 5/2014 | Ng | |
| 2016/0331618 A1 * | 11/2016 | Hood | A61G 7/1046 |
| 2017/0027794 A1 | 2/2017 | Andersson et al. | |
| 2017/0027797 A1 | 2/2017 | Dolliver et al. | |

FOREIGN PATENT DOCUMENTS

| | | |
|---|---|---|
| WO | 2007075701 A2 | 7/2007 |
| WO | 2010141865 A1 | 12/2010 |
| WO | 2015/024569 A1 | 2/2015 |

OTHER PUBLICATIONS

LiftAll; RFID Tagging; [online], www.lift-all.com; (Nov. 2009). p. 1.

Extended European Search Report & Written Opinion dated Feb. 27, 2015 relating to EP Patent Application No. 13176406.0. pp. 1-12.

Non-Final Office Action dated Jun. 12, 2014 relating to U.S. Appl. No. 13/941,161, filed Jul. 12, 2013. pp. 1-10.

Non-Final Office Action dated Feb. 9, 2015 relating to U.S. Appl. No. 13/941,161, filed Jul. 12, 2013. pp. 1-11.

Non-Final Office Action dated Dec. 3, 2015 relating to U.S. Appl. No. 13/941,161, filed Jul. 12, 2013. pp. 1-13.

Non-Final Office Action dated Sep. 10, 2015 relating to U.S. Appl. No. 13/941,179, filed Jul. 12, 2013. pp. 1-9.

Non-Final Office Action dated Nov. 17, 2016 relating to U.S. Appl. No. 13/941,161, filed Jul. 12, 2013. pp. 1-16.

Final Office Action dated Sep. 19, 2016 relating to U.S. Appl. No. 13/941,161, filed Jul. 12, 2013. pp. 1-15.

Non-Final Office Action dated May 16, 2016 relating to U.S. Appl. No. 13/941,161, filed Jul. 12, 2013. pp. 1-13.

Final Office Action dated Apr. 12, 2016 relating to U.S. Appl. No. 13/941,179, filed Jul. 12, 2013. pp. 1-9.

Non-Final Office Action dated Aug. 3, 2016 relating to U.S. Appl. No. 13/941,179, filed Jul. 12, 2013. pp. 1-10.

Final Office Action dated Jan. 30, 2017 relating to U.S. Appl. No. 13/941,179, filed Jul. 12, 2013. pp. 1-11.

Letter dated Sep. 15, 2014 from Ari M. Bai with Poisinelli; One East Street, Syuite 1200; Phoenix, AZ 85004-2568 Re: U.S. Appl. No. 13/941,161 Monitoring Systems Devices and Methods for Patient Lift. Refers to U.S. Appl. No. 8,538,710 and U.S. Publication No. 2014/0013503.

Claim Chart for U.S. Patent Application Publication No. 2014/0013503 ('503 Application), Dixon et al. Monitoring Systems Devices and Methods for Patient Lift. Refers to U.S. Pat. No. 8,538,710 (the '710 Patent) Todd at al. Methods and Systems for Monitoring Lift Usage.

Extended European Search Report dated Nov. 14, 2016 relating to EP Patent Application No. 16176711.6. pp. 1-12.

Extended European Search Report dated Dec. 12, 2016 relating to EP Patent Application No. 16181917.2. pp. 1-7.

Advisory Action dated Apr. 11, 2017 relating to U.S. Appl. No. 13/941,179, filed Jul. 12, 2013. pp. 1&2.

Non-Final Office Action dated Jun. 21, 2017 relating to U.S. Appl. No. 13/941,179, filed Jul. 12, 2013. pp. 1-10.

Pre-Brief Appeal Conference Decision dated Oct. 6, 2017 relating to U.S. Appl. No. 13/941,179, filed Jul. 12, 2013. pp. 1 & 2.

Examiner's Answer to Appeal Brief dated Feb. 15, 2018 relating to U.S. Appl. No. 13/941,179, filed Jul. 12, 2013. pp. 1-8.

Patent Board Decision dated Mar. 25, 2019 relating to U.S. Appl. No. 13/941,179, filed Jul. 12, 2013. pp. 1-10.

* cited by examiner

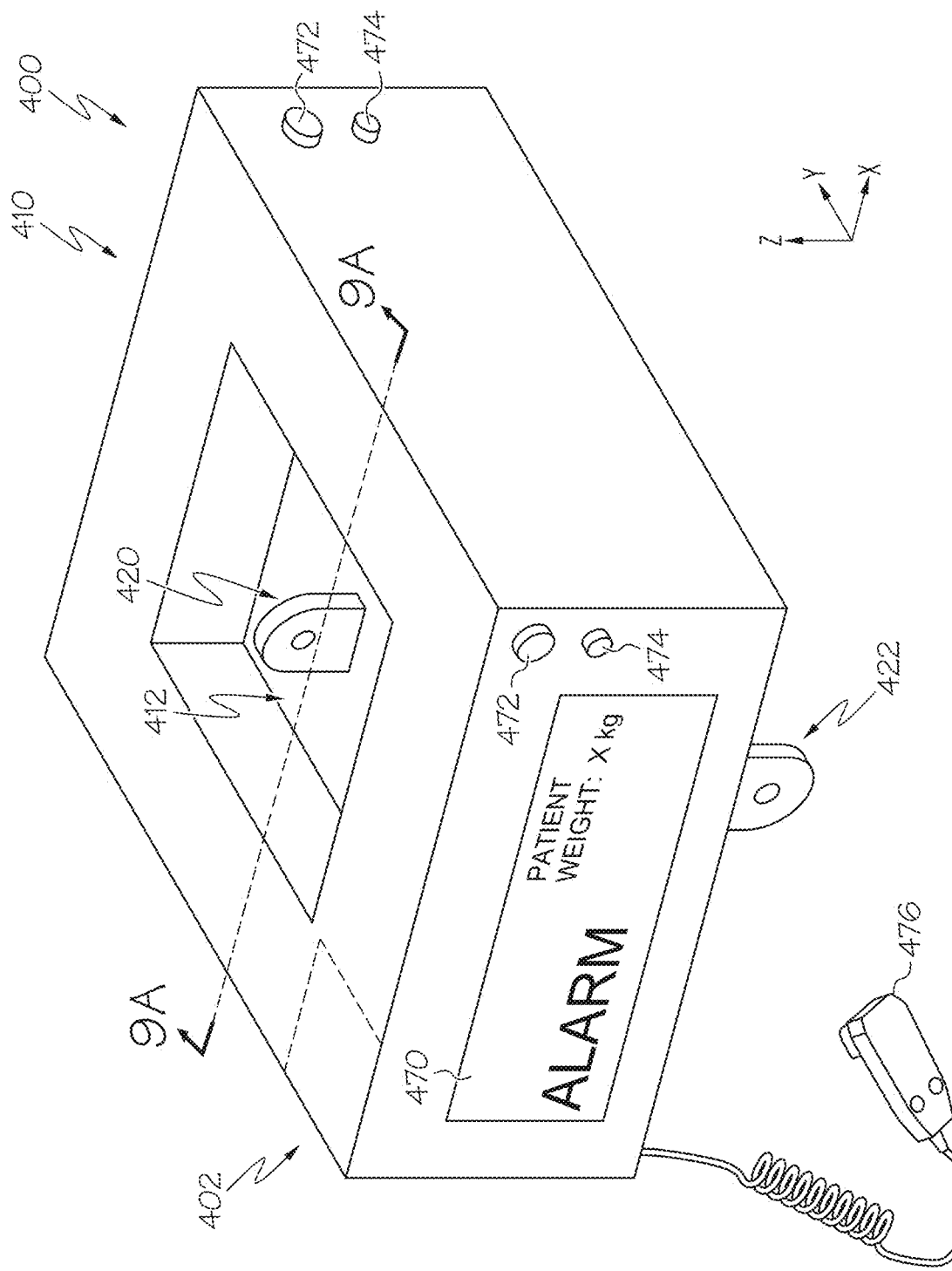

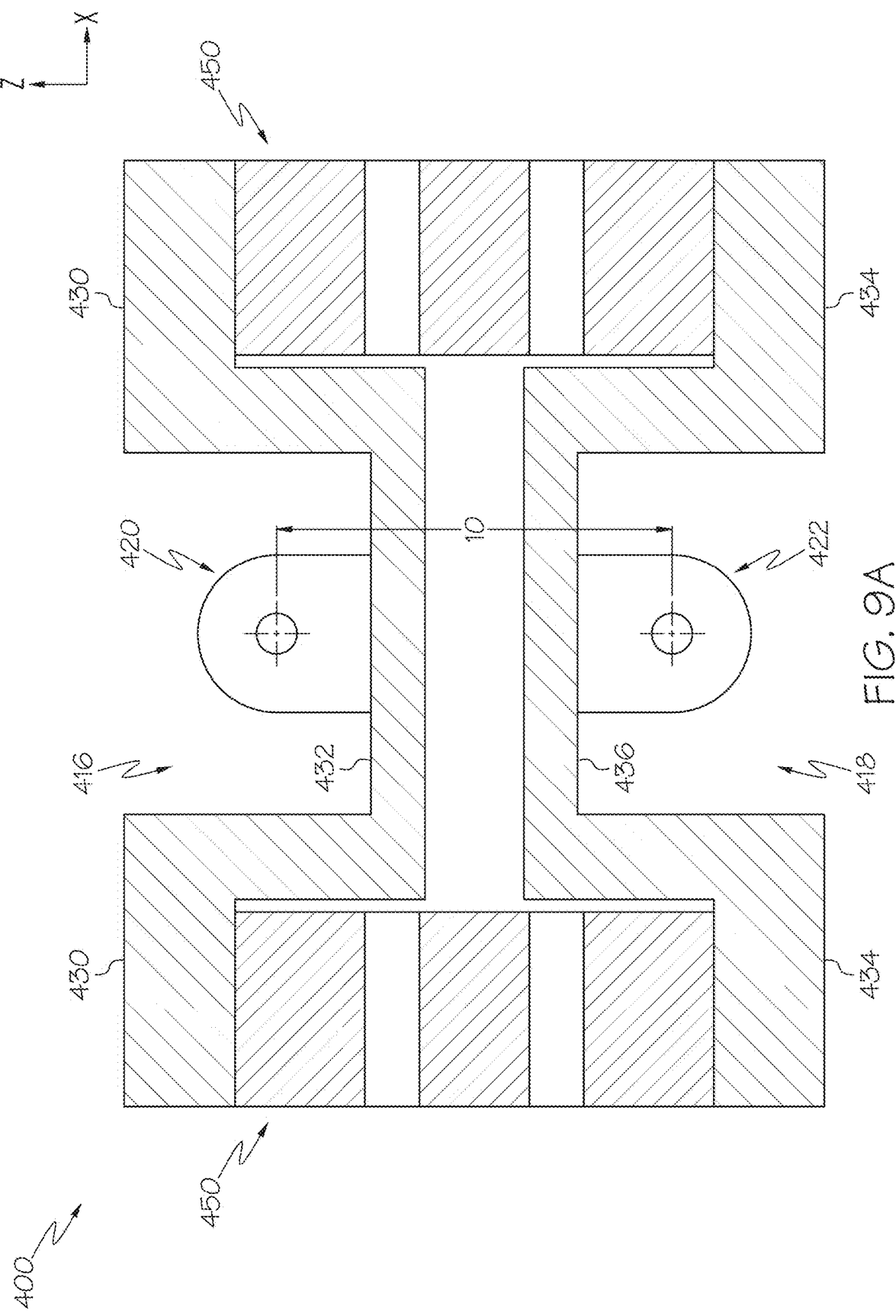

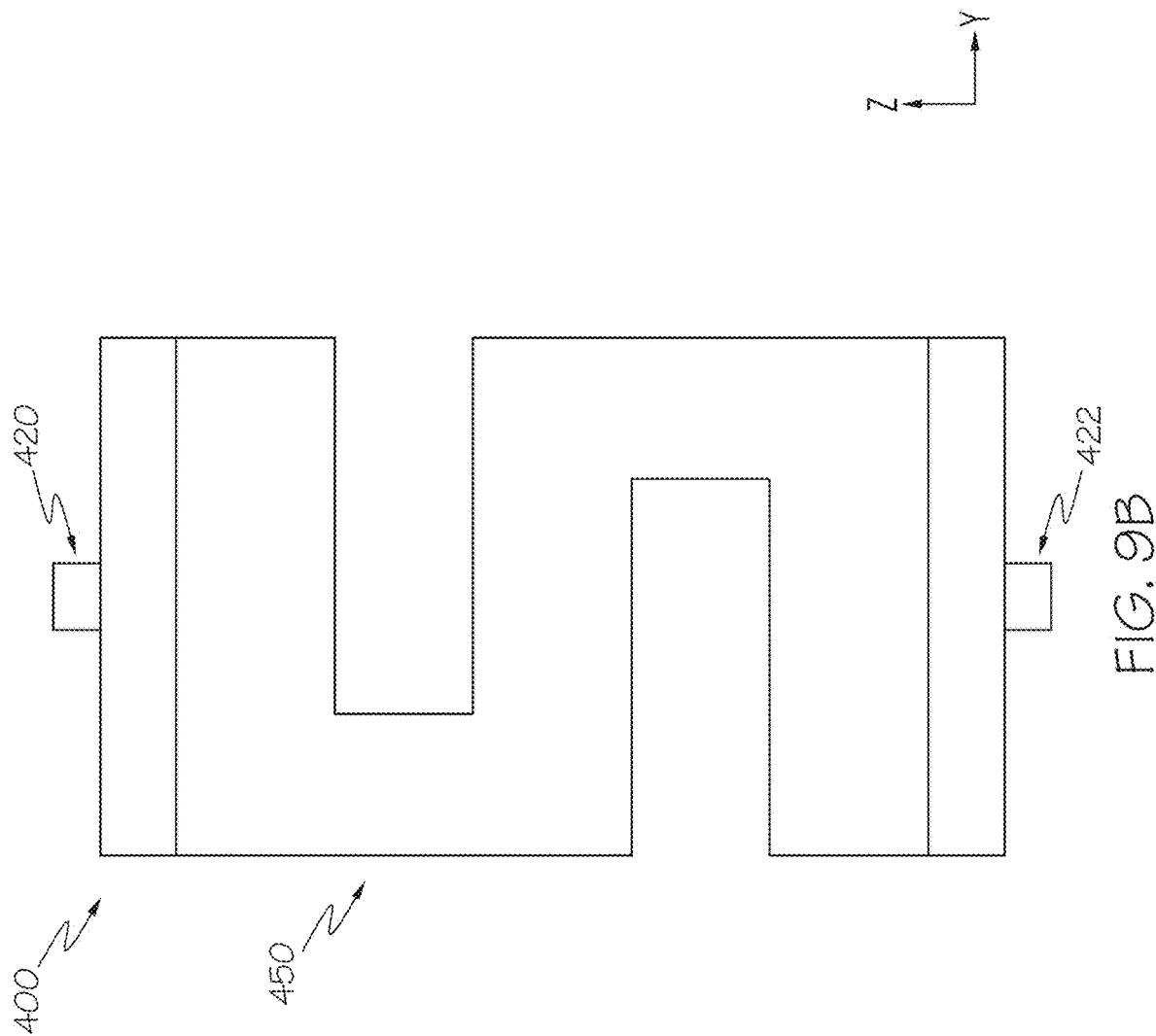

PERSON LIFT DEVICES AND SCALE ASSEMBLIES FOR PERSON LIFT DEVICES INCLUDING ACCESSORY TRACKING FEATURES

CROSS-REFERENCE TO RELATED APPLICATIONS

This application is a Division of U.S. patent application Ser. No. 15/213,968 filed Jul. 19, 2016 and entitled "Person Lift Devices and Scale Assemblies For Person Lift Devices Including Accessory Tracking Features," which claims the benefit of U.S. Provisional Patent Application Ser. No. 62/199,603 filed Jul. 31, 2015 and entitled "Person Lift Devices and Scale Assemblies For Person Lift Devices Including Accessory Tracking Features," the contents of which are each incorporated by reference herein in their entirety.

BACKGROUND

Field

The present specification generally relates to person lifting devices, such as person lift devices including mobile lifts and/or overhead lifts and, more particularly, to person lifting devices and scale assemblies for person lifting devices with sling detection features and methods for operating the same.

Technical Background

Person lifting devices, such as mobile lifts and/or overhead lifts, may used in hospitals, other health care facilities, and sometimes in home care settings to move a person from one location to another or to assist the person in moving. Conventional person lifting devices utilize various accessories that attach to the person lifting device. For example a sling or other attachment may secure a person to the lifting device and an actuator to lift the person to a higher elevation or lower the person to a lower elevation. In one typical example the caregiver operates the actuator to raise the patient off a bed, repositions the person by moving the lifting device to a desired location, and then operates the actuator again to lower the patient to the destination.

The various accessories for attachment to the person lifting device may be designed to be used in a specific orientation to facilitate proper lifting. Accordingly, a need exists for alternative devices and methods for insuring the placement and orientation of lift accessories on person lifting devices.

SUMMARY

In one embodiment, a scale assembly for a person lifting device includes an outer housing, an upper member positioned at least partially within the outer housing, the upper member including an outer portion and a recessed portion that is positioned below the outer portion of the upper member in a vertical direction, a lower member positioned at least partially within the outer housing, where the lower member is detached and spaced apart from the upper member in the vertical direction, the lower member including an outer portion and a recessed portion that is positioned above the outer portion of the lower member in the vertical direction, and at least one force sensor positioned between the upper member and the lower member in the vertical direction, where the at least one force sensor is coupled to the outer portion of the upper member and the outer portion of the lower member.

In another embodiment, a method of operating a scale assembly for a person lifting device includes detecting an identification of a sling bar with an accessory detector of the scale assembly, detecting an identification of an accessory with at least one of the accessory detector and a coupling detector of the scale assembly, comparing the identification of the accessory with an array of one or more compatible accessories associated with the identification of the sling bar, automatically with an electronic control unit that is communicatively coupled to at least one of the accessory detector and the coupling detector, and communicating a warning signal when the identification of the accessory is not in the array of one or more compatible accessories, automatically with the electronic control unit.

In yet another embodiment, a scale assembly system for use with a person lifting device includes an upper member, an upper coupling coupled to the upper member and selectively coupled to the person lifting device, a lower member positioned below the upper member in a vertical direction, a lower coupling coupled to the lower member and selectively coupled to a sling bar, at least one force sensor coupled to and positioned between the upper member and the lower member in the vertical direction, at least one of an accessory detector and a coupling detector, and an electronic control unit communicatively coupled to at least one of the accessory detector and the coupling detector, the electronic control unit including a processor and a computer readable and executable instruction set, which when executed by the processor, detects an identification of the sling bar with the accessory detector, detects an identification of an accessory with at least one of the accessory detector and the coupling detector, compares the identification of the accessory with an array of one or more compatible accessories associated with the identification of the sling bar, automatically with the electronic control unit, and communicates a warning signal when the identification of the accessory is not in the array of one or more compatible accessories, automatically with the electronic control unit.

Additional features of the person lifting devices and scale assemblies for person lifting devices and methods for operating the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 8 schematically depicts a perspective view of the scale assembly of FIG. 7 according to one or more embodiments shown and described herein;

FIG. 9A schematically depicts a section view of the scale assembly of FIG. 8 along section 9A-9A according to one or more embodiments shown and described herein;

FIG. 9B schematically depicts a side view of the scale assembly of FIG. 8 according to one or more embodiments shown and described herein;

DETAILED DESCRIPTION

Figure 1A:
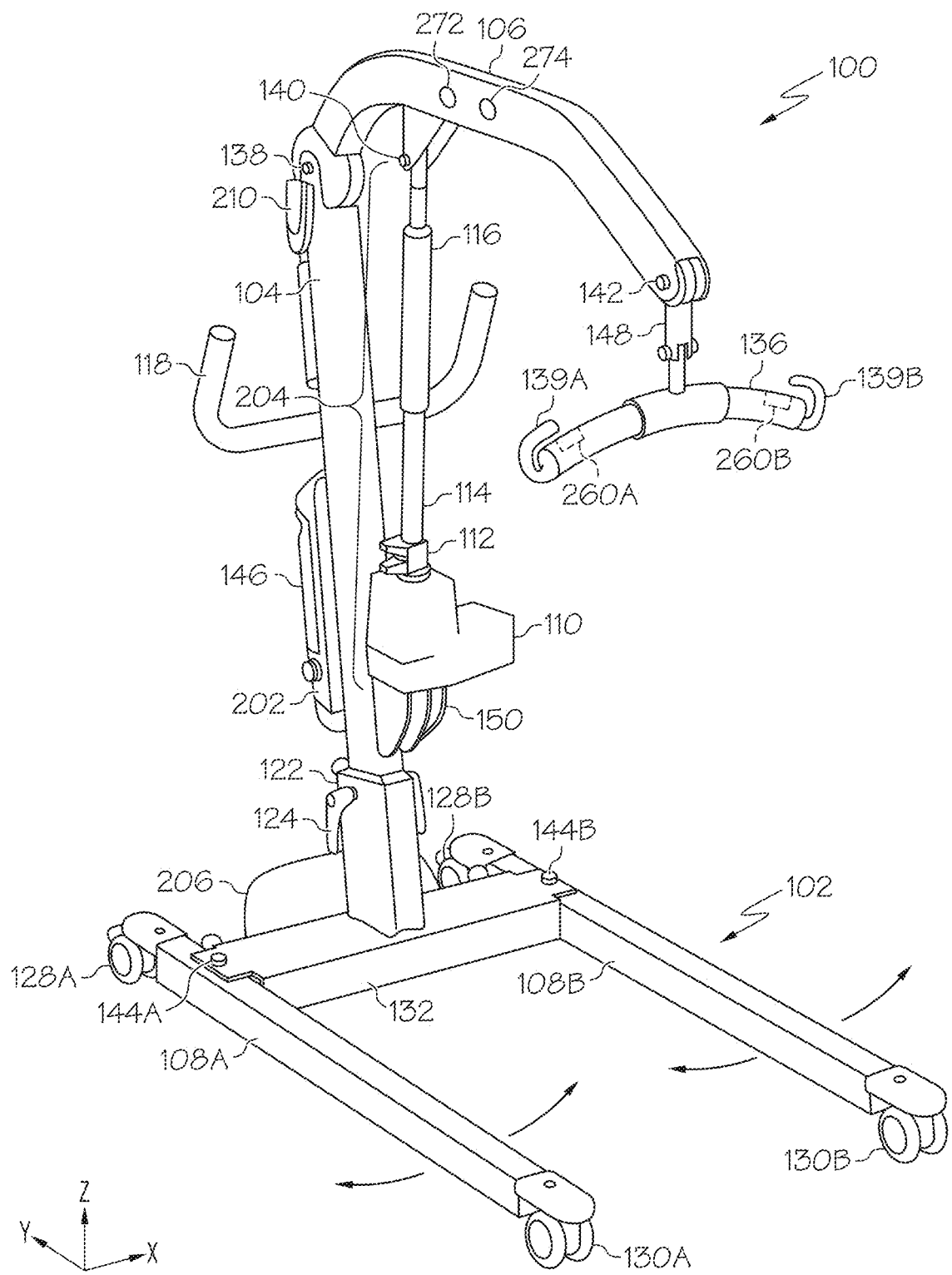
FIG. 1A schematically depicts a front perspective view of a mobile lift according to one or more embodiments shown and described herein.

Reference will now be made in detail to embodiments of person lifting devices and scale assemblies for person lifting devices, and methods of operating the same, examples of which are illustrated in the accompanying drawings. Whenever possible, the same reference numerals will be used throughout the drawings to refer to the same or like parts. In one embodiment, a scale assembly for a person lifting device includes an outer housing, an upper member positioned at least partially within the outer housing, the upper member including an outer portion and a recessed portion that is positioned below the outer portion of the upper member in a vertical direction. The scale assembly further includes a lower member positioned at least partially within the outer housing, where the lower member is detached and spaced apart from the upper member in the vertical direction, the lower member including an outer portion and a recessed portion that is positioned above the outer portion of the lower member in the vertical direction. The scale assembly further includes at least one force sensor positioned between the upper member and the lower member in the vertical direction, where the at least one force sensor is coupled to the outer portion of the upper member and the outer portion of the lower member. Various embodiments of person lifting devices and scale assemblies for person lifting devices will be described herein with specific reference to the appended drawings.

As used herein, the term "longitudinal direction" refers to the forward-rearward direction of the components of the person lifting devices (i.e., in the +/−Y-direction as depicted). The term "lateral direction" refers to the crosswise direction of the components of the person lifting devices (i.e., in the +/−X-direction as depicted), and is transverse to the longitudinal direction. The term "vertical direction" refers to the upward-downward direction of the components of the person lifting devices (i.e., in the +/−Z-direction as depicted).

Figure 1B:
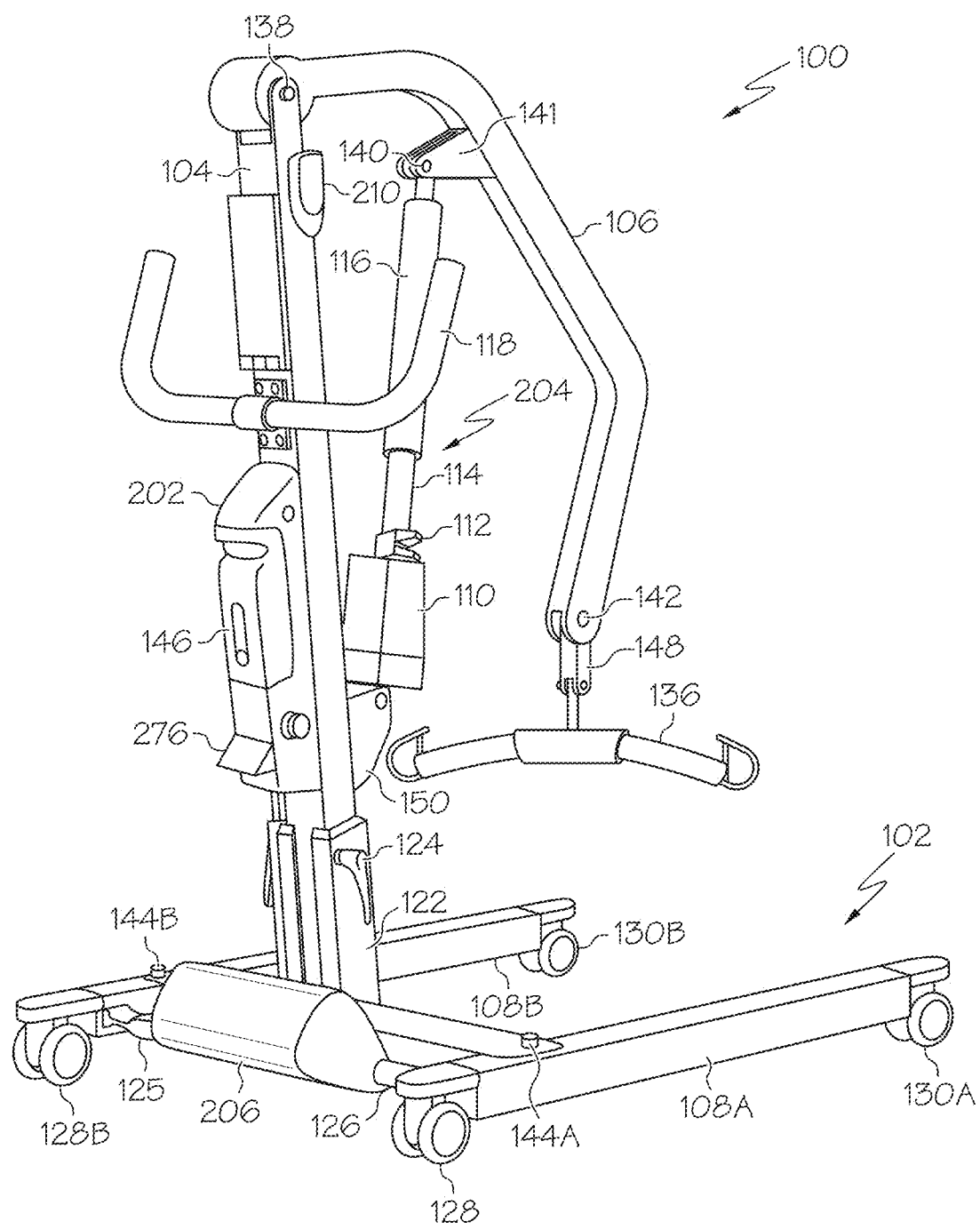
FIG. 1B schematically depicts a rear perspective view of a mobile lift according to one or more embodiments shown and described herein.

Referring now to FIGS. 1A and 1B, one embodiment of a person lifting device 100 is schematically illustrated. The person lifting device 100 may generally comprise a base 102, a lift mast 104 and a lift arm 106. The base may comprise a pair of base legs 108A, 108B which are pivotally attached to a cross support 132 at base leg pivots 144A, 144B such that the base legs 108A, 108B may be pivotally adjusted with respect to the lift mast 104 as indicated by the arrows. The base legs 108A, 108B may be pivoted with the base actuator 206 which is mechanically coupled to both base legs 108A, 108B with base motor linkages 125, 126. In one embodiment, the base actuator 206 may comprise a linear actuator such as a motor mechanically coupled to telescoping threaded rods connected to the base motor linkages 125, 126 such that, when an armature of the motor is rotated, one of the threaded rods is extended or retracted relative to the other. For example, in the configuration shown in FIGS. 1A and 1B, when the rods are extended, the base legs 108A and 108B are pivoted towards one another and, when the rods are retracted, the base legs 108A and 108B are pivoted away from one another. The base legs 108A, 108B may additionally comprise a pair of front casters 130A, 130B and a pair of rear casters 128A, 128B. The rear casters 128A, 128B may comprise caster brakes (not shown).

In one embodiment, the base 102 may further comprise a mast support 122 disposed on the cross support 132. In one embodiment, the mast support 122 may be a rectangular receptacle configured to receive the lift mast 104 of the person lifting device 100. For example, a first end of the lift mast 104 may be adjustably received in the mast support 122 and secured with a pin, threaded fastener, or a similar fastener coupled to the adjustment handle 124. The pin or threaded fastener extends through the mast support 122 and into a corresponding adjustment hole(s) (not shown) on the lift mast 104. Accordingly, it will be understood that the position of the lift mast 104 may be adjusted vertically with respect to the base 102 by repositioning the lift mast 104 in the mast support 122. The lift mast 104 may further comprise at least one handle 118 coupled to the lift mast 104. The handle 118 may provide an operator with a grip for moving the person lifting device 100 on the front casters 130A, 130B and the rear casters 128A, 128B. Accordingly, it should be understood that, in at least one embodiment, the person lifting device 100 is mobile.

The person lifting device 100 may further comprise a lift arm 106 which is pivotally coupled to the lift mast 104 at the lift arm pivot 138 at a second end of the lift mast 104 such that the lift arm 106 may be pivoted (e.g., raised and lowered) with respect to the base 102. FIG. 1A shows the lift arm 106 in the fully raised position while FIG. 1B shows the lift arm 106 in the fully lowered position. The lift arm 106 may comprise at least one sling bar 136 coupled to the lift arm 106 with a coupling member 148 such that the sling bar 136 is raised or lowered with the lift arm 106. In the embodiment shown in FIGS. 1A and 1B the coupling member 148 is pivotally attached to the lift arm 106 at an end of the lift arm 106 opposite the lift arm pivot 138. In one embodiment, the coupling member 148 is pivotally attached to the lift arm 106 at attachment pivot 142 such that the sling bar 136 may be pivoted with respect to the lift arm 106. However, it should be understood that, in other embodiments, the coupling member 148 may be fixedly attached to the lift arm 106 or that the sling bar 136 may be directly coupled to the lift arm 106 without the use of a coupling member 148.

In the embodiments described herein, the person lifting device 100 is a mechanized lifting device. Accordingly, raising and lowering the lift arm 106 with respect to the base 102 may be achieved using an actuator such as a lift actuator 204. In the embodiments shown, the lift actuator 204 is a linear actuator which comprises a motor 110 mechanically coupled to an actuator arm 114. More specifically, the motor 110 may comprise a rotating armature (not shown) and the actuator arm 114 may comprise one or more threaded rods coupled to the armature such that, when the armature is rotated, the threaded rods are extended or retracted relative to one another and the actuator arm 114 is extended or retracted. In the embodiment shown in FIG. 1, the lift actuator 204 further comprises a support tube 116 disposed over the actuator arm 114. The support tube 116 provides lateral support (e.g., support in the X and/or Y directions) to the actuator arm 114 as the actuator arm 114 is extended. The lift actuator 204 (and base actuator 206) are coupled to an electronic control unit 202 which facilitates actuation and control of both the lift actuator 204 and the base actuator 206.

In the embodiment shown in FIGS. 1A and 1B, the lift actuator 204 is fixedly mounted on the lift mast 104 and pivotally coupled to the lift arm 106. In particular, the lift mast 104 comprises a bracket 150 to which the motor 110 of the lift actuator 204 is attached while the actuator arm 114 is pivotally coupled to the lift arm 106 at the actuator pivot 140. Accordingly, it should be understood that, by actuating the lift actuator 204 with the motor 110, the actuator arm 114 is extended or retracted thereby raising or lowering the lift arm 106 relative to the base 102. In one embodiment, the lift actuator 204 may further comprise an emergency release 112. The emergency release 112 facilitates the manual retraction of the actuator arm 114 in the event of a mechanical or electrical malfunction of the lift actuator 204.

While the embodiments described herein refer to the lift actuator 204 as comprising a motor 110 and an actuator arm 114, it will be understood that the actuator may have various other configurations and may include a hydraulic or pneumatic actuator comprising a mechanical pump or compressor, or a similar type of actuator. Further, in other embodiments, where the lifting device is a cable-based lift system, the actuator may be a motor which pays out and/or takes-up cable thereby raising and/or lowering an attached load. Accordingly, it will be understood that various other types of actuators may be used to facilitate raising and lowering the lift arm 106 and/or an attached load with respect to the base 102.

Still referring to FIGS. 1A and 1B, the person lifting device 100 may further comprise an electronic control unit 202. The electronic control unit 202 may comprise a battery 146 and may be electrically coupled to the lift actuator 204 and the base actuator 206. The electronic control unit 202 may be operable to receive an input from an operator via a control device coupled to the electronic control unit 202. The control device may comprise a wired controller and/or one or more wireless controllers. For example, in one embodiment, the control device may be a wired controller (such as a pendant or the like) or, alternatively, a controller integrated into the electronic control unit 202. In another embodiment, the controller may be a wireless controller such as a wireless hand control and/or a wireless diagnostic monitor/control. Based on the input received from the control device, the control unit is programmed to adjust the position of the lift arm 106 and/or the position of the base legs 108A, 108B by sending electric control signals to the lift actuator 204 and/or the base actuator 206.

Referring to FIG. 1B, the person lifting device 100 may further comprise an accessory detector 276, such as a bar code scanner, QR code reader, RFID tag reader or the like, communicatively coupled to the electronic control unit 202. The accessory detector 276 may be used to detect the identity of accessories coupled to the person lifting device 100 and, in conjunction with the electronic control unit 202, determine the compatibility of the accessories, as will be described in further detail herein. For example, in the embodiment of the person lifting device 100 depicted in FIGS. 1A and 1B, the accessory detector 276 is a bar code scanner communicatively coupled to the electronic control unit 202. In this embodiment, the bar code scanner may be utilized by a caregiver to scan accessories and sling bars attached to the person lifting device 100 and store the identification of these accessories and sling bars in memory. In alternative embodiments, the accessory detector 276 may be an RFID tag reader positioned atop the person lifting device 100 with an active region that envelopes the person lifting device 100. However, the active region may be shaped through the use of appropriate antennas and readers such that only RFID tagged components attached to the person lifting device 100 are identified by the accessory detector 276. The accessory detector 276 may include, for example, CS468 RFID reader and a CS790 antenna available from Convergence Systems Ltd. of Hong Kong which may be used in conjunction with one another to shape the active area of the accessory detector 276. However, it should be understood that other RFID readers and antennas suitable for shaping the active area of the accessory detector 276 may be used.

While FIGS. 1A and 1B depict the person lifting device 100 as a mobile patient lift, it should be understood that the lift control systems and methods for operating a person lifting device described herein may be used in conjunction with other person lifting devices having various other configurations including, without limitation, stationary lifting devices and overhead lifting devices. Further, it should also be understood that, while specific embodiments of the person lifting device described herein relate to person lifting devices used for raising and/or lowering patients, the lift control systems described herein may be used with any lifting device which is operable to raise and lower a load.

Figure 2:
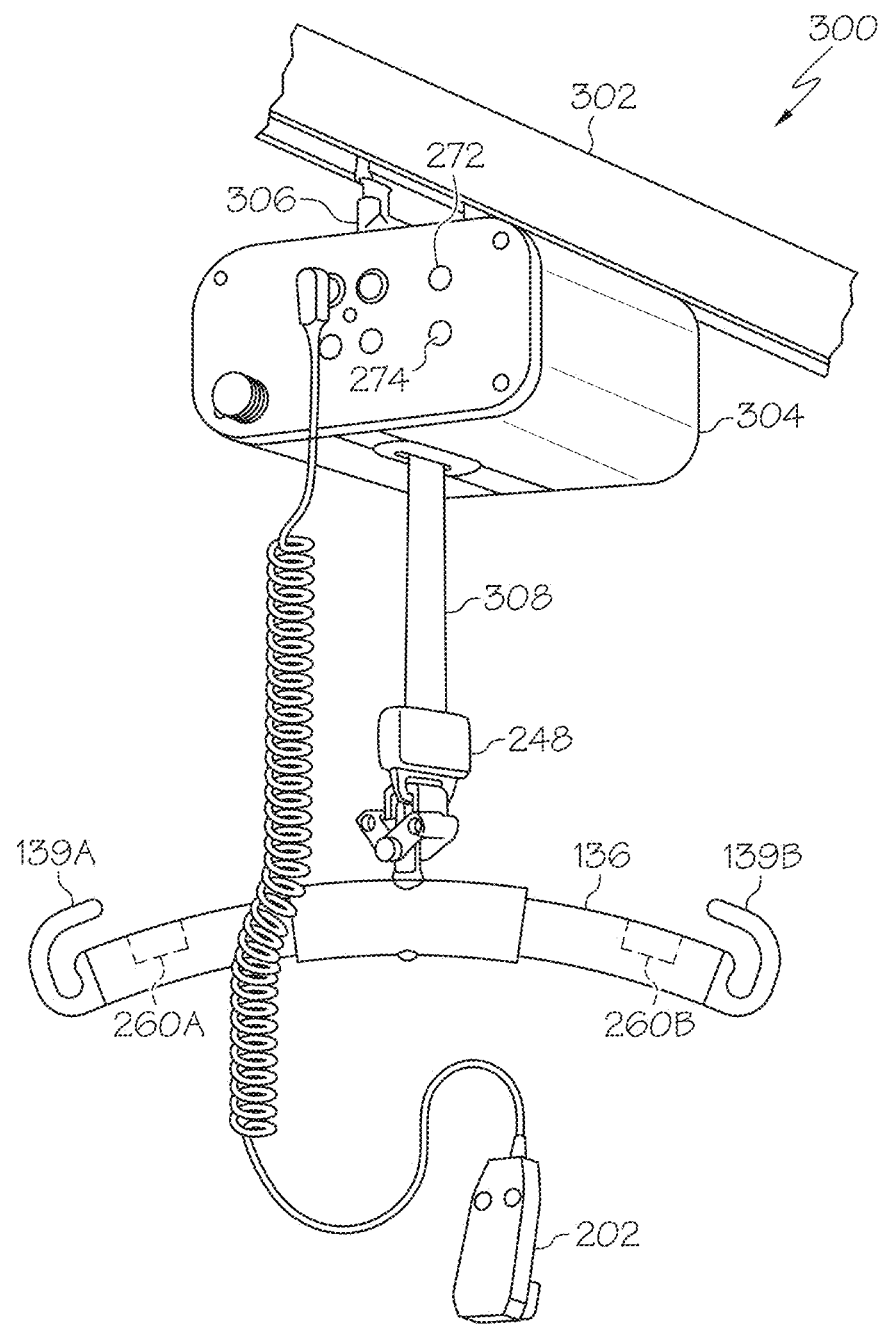
FIG. 2 schematically depicts a perspective view of an overhead lift according to one or more embodiments shown and described herein.
Figure 3:
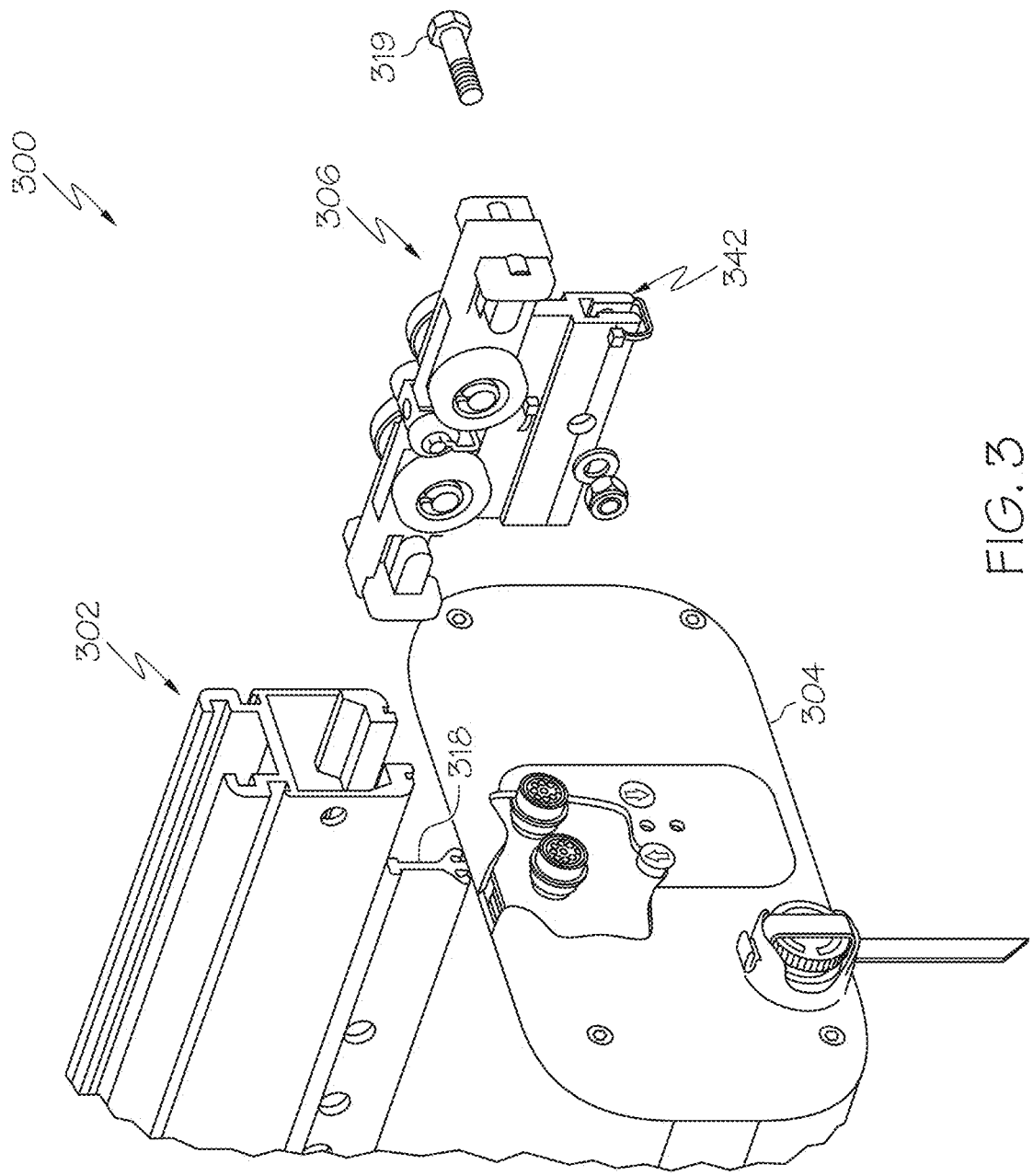
FIG. 3 schematically depicts an exploded view of the overhead lift of FIG. 2.

For example, FIGS. 2 and 3 depict another embodiment in which the person lifting device 300 is a rail-mounted lift system. In this embodiment, the person lifting device 300 generally comprises a lift unit 304 which is slidably coupled to a rail 302 with a carriage 306. The lift unit 304 may be used to support and/or lift a patient with a lifting strap 308 which is coupled to a lift actuator, in this case a motor, contained within the lift unit 304. The lift actuator facilitates paying-out or taking-up the lifting strap 308 from the lift unit 304 thereby raising and lowering a patient attached to the lifting strap 308. For example, an end of the lifting strap 308 may include a coupling member 248 to which a sling bar 136 may be attached. In the embodiments described herein, the lift unit 304 further includes a battery which is housed in the lift unit 304 and electrically coupled to the lift actuator thereby providing power to the lift actuator 333. However, it should be understood that, in other embodiments, the lift unit 304 may be constructed without the battery, such as when the lift actuator is directly wired to a power source. The person lifting device 300 may further include an electronic control unit 202 which is communicatively coupled to the lift actuator and facilitates actuation and control of the lift actuator, specifically paying out and taking up the lifting strap 308.

In the embodiment of the person lifting device shown in FIGS. 2 and 3, a person may be attached to the lifting strap 308 with a sling bar 136 attached to the lifting strap 308. For example, the sling bar 136 may be attached to a harness or sling in which the person is positioned to facilitate the lifting operation. The lift unit 304 may be actuated with the electronic control unit 202 to pay out or take up the lifting strap 308 from the lift unit 304. In the embodiment shown in FIG. 2, the electronic control unit 202 is directly wired to the lift unit 304. However, it should be understood that, in other embodiments, the electronic control unit 202 may be wirelessly coupled to the lift unit 304 to facilitate remote actuation of the lift unit 304.

Referring now to the exploded view of the person lifting device 300 schematically depicted in FIG. 3, the lift unit 304 is mechanically coupled to a carriage 306 which facilitates slidably positioning the lift unit 304 along rail 302. In the embodiments of the lift unit 304 described herein, the lift unit 304 includes a connection rail 318 which is mounted to the top surface of the lift unit 304. The connection rail 318 facilitates connecting and securing the lift unit 304 to the carriage 306. In the embodiment of the lift unit 304 shown in FIG. 3, the connection rail 318 has a T-shaped configuration and the carriage 306 has a receiving slot 342 with a complimentary configuration for receiving the connection rail 318. The carriage 306 may be secured to the connection rail 318 with a fastener 319, such as a bolt and nut as depicted in FIG. 3, which extends transversely through openings in the carriage 306 and a corresponding opening in the connection rail 318.

Figure 4:
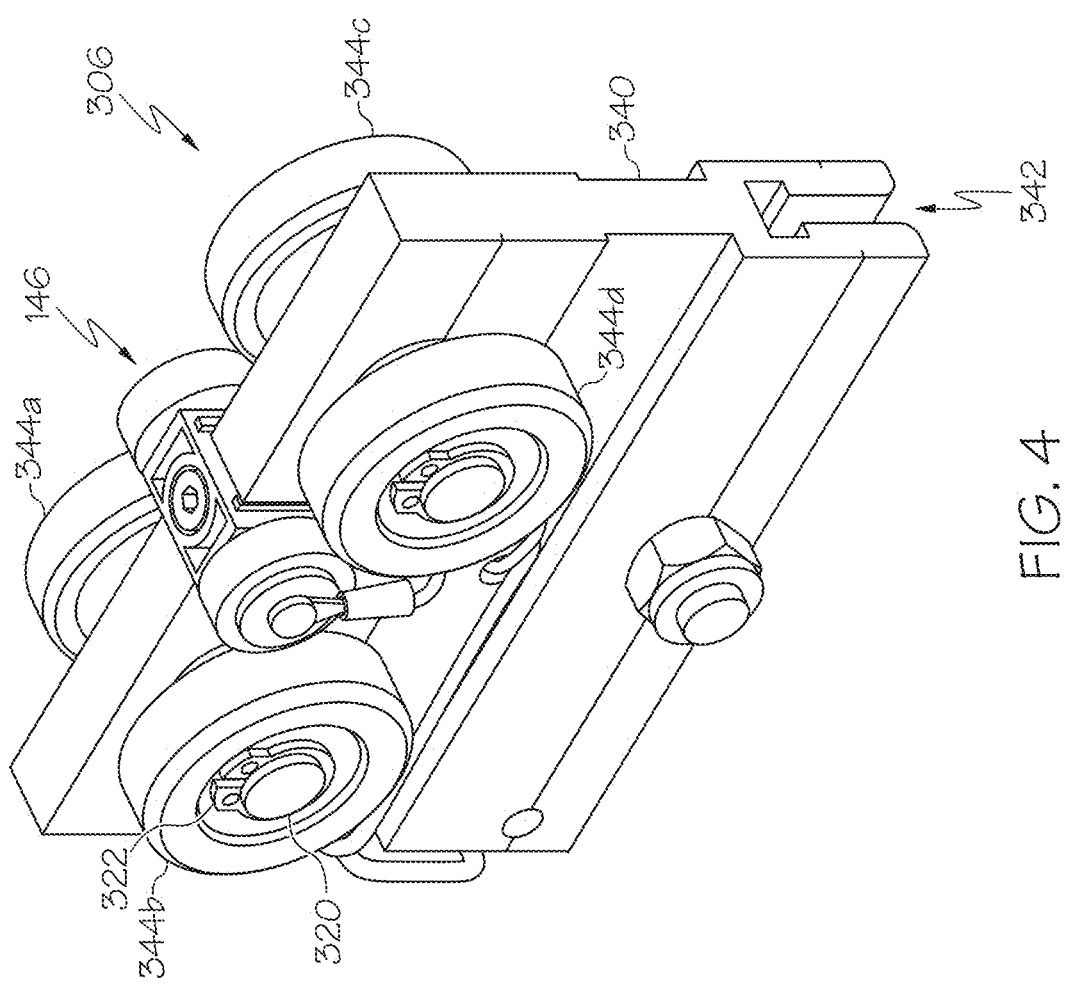
FIG. 4 schematically depicts a carriage of the overhead lift of FIGS. 2 and 3.

Referring now to FIG. 4, the carriage 306 generally comprises a carriage body 340 to which a plurality of support wheels 344a, 344b, 344c, and 344d are rotatably attached for supporting the carriage 306 in the rail. The support wheels 344a, 344b, 344c, and 344d facilitate positioning the carriage 306 and lift unit along the length of the rail. In the embodiments described herein, the carriage 306 is depicted with four support wheels. However, it is contemplated that the carriage 306 may be constructed with fewer than 4 support wheels. For example, in some embodiments, the carriage may be constructed with one or two support wheels (i.e., a pair of support wheels). Accordingly, it should be understood that the carriage 306 includes at least one support wheel. The support wheels 344a-d are positioned on axles 320 which extend transversely through the carriage body 340. Each support wheel is secured to the axle 320 with a fastener, such as retaining clips 322, such that the support wheels are rotatable on the axle 320.

In the embodiment of the carriage 306 depicted in FIG. 4, the support wheels 344a, 344b, 344c, and 344d are passive (i.e., the support wheels are not actively driven with a motor or a similar drive mechanism) and the lift unit is manually traversed along the rail. However, in alternative embodiments (not shown), the support wheels may be actively driven such as when the support wheels are coupled to a motor or a similar mechanism. In such embodiments, the drive mechanism may be communicatively coupled to an electronic control unit (such as electronic control unit 202 shown in FIG. 2) which actuates the drive mechanism and facilitates traversing the lift unit along the rail with the drive mechanism.

The person lifting device 300 may further comprise an accessory detector (not shown), such as a bar code scanner, QR code reader, RFID tag reader or the like, communicatively coupled to the electronic control unit 202. The accessory detector may be used to detect the identity of accessories coupled to the person lifting device 300, as described above, and, in conjunction with the electronic control unit 202, determine the compatibility of the accessories, as will be described in further detail herein.

Referring now to FIGS. 1A, and 2, in the embodiments described herein the person lifting device further includes at least one coupling detector, such as coupling detectors 260A, 260B, communicatively coupled to the electronic control unit 202, either by wire or wirelessly. The coupling detectors 260A, 260B are utilized to detect the identification of accessory coupling members (not shown) attached to the lifting hooks 139A, 139B to determine proper connection of an accessory (not shown), such as a lifting sling, lifting vest, lifting strap, lifting sheet or the like, to the sling bar 136. In the embodiments of the person lifting devices depicted in FIGS. 1A and 2, the coupling detectors 260A, 260B are radio frequency identification (RFID) readers operatively coupled to the sling bar 136. The RFID readers interrogate RFID tags operatively coupled to an accessory coupling member attached to the corresponding lifting hooks 139A, 139B to determine a unique identity of the accessory coupling member and, in conjunction with the electronic control unit 202, determine if the accessory is properly connected to the person lifting device. While the coupling detectors 260A, 260B have been described herein as comprising RFID readers, it should be understood that, in other embodiments, the coupling detectors 260A, 260B may be bar code readers or other, similar detectors, suitable for reading unique identifying indicia of an accessory coupling member of an accessory.

Figure 5:
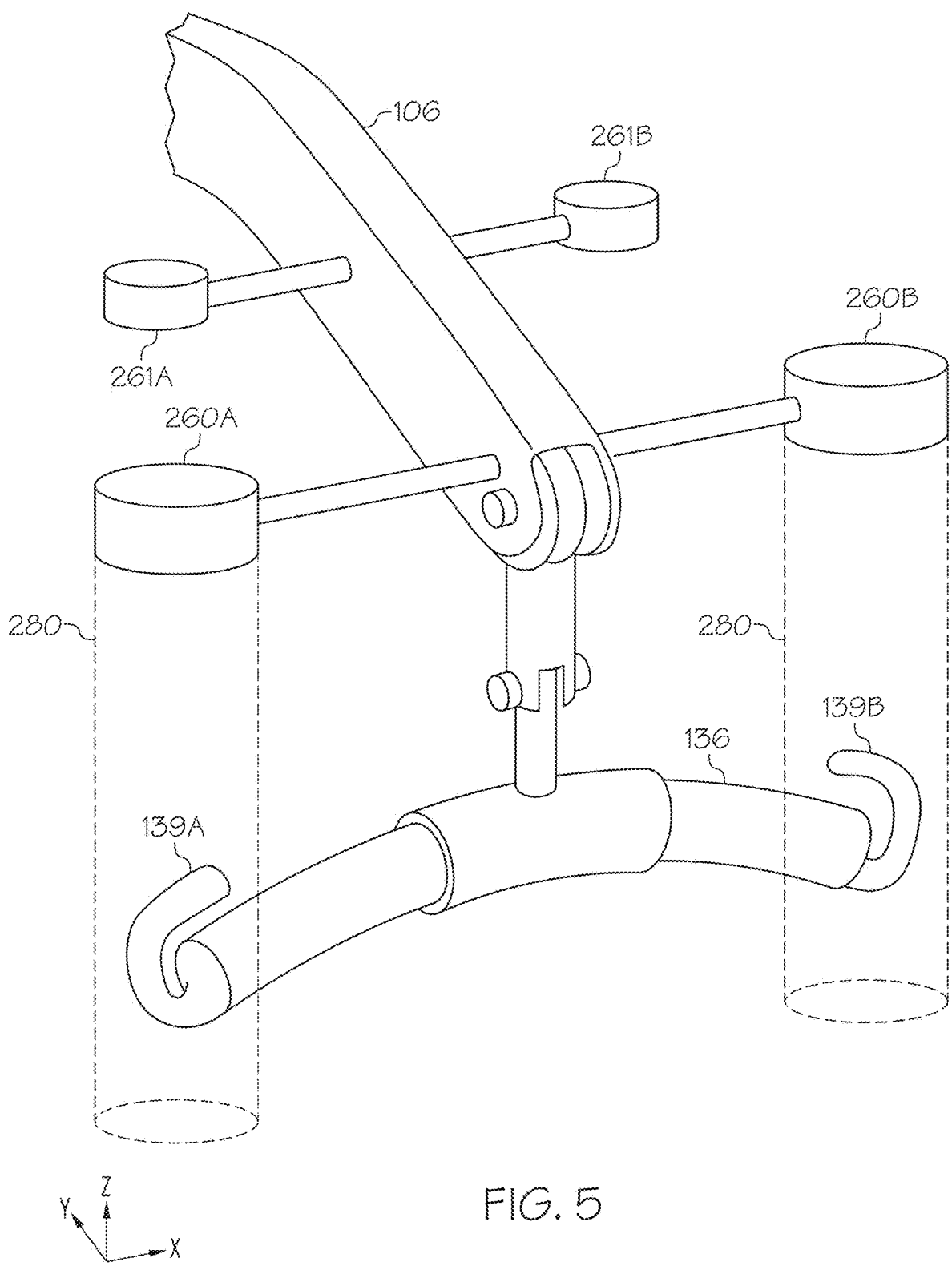
FIG. 5 schematically depicts coupling detectors attached to a person lifting device according to one or more embodiments shown and described herein.

Referring now to FIG. 5, in alternative embodiments, the coupling detectors 260A, 260B may be operatively coupled to a structural component of the person lifting device, such as the lift arm 106 of the person lifting device as shown in FIG. 1A, or even the lift unit 304 of the person lifting device 300 depicted in FIG. 2. As noted above, the coupling detectors 260A, 260B are communicatively coupled to the electronic control unit 202, either by wire or wirelessly. In these embodiments, the coupling detectors 260A, 260B are RFID readers which utilize evanescent wave technology to produce a shaped and constrained active area 280 within which an RFID tag can be interrogated by the RFID reader. In these embodiments, the coupling detectors 260A, 260B may include a CS468 RFID reader and a CS790 antenna available from Convergence Systems Ltd. of Hong Kong which may be used in conjunction with one another to shape the active areas of the coupling detectors. However, it should be understood that other RFID readers and antennas suitable for shaping the active area of the reader may be used. In these embodiments, the active areas 280 of the coupling detectors 260A, 260B extend from the coupling detectors a distance to sufficient to envelope the end portions of the sling bar 136, including the lifting hooks 139A, 139B, so that the coupling detectors 260A, 260B are able to interrogate an RFID tag attached to an accessory coupling member engaged with the corresponding lifting hooks 139A, 139B. However, due to the shape and constraint of the active areas 280, the coupling detectors 260A, 260B do not detect or interrogate RFID tags located outside the active areas 280, thereby avoiding mis-detection and mis-interrogation of RFID tags which are not associated with accessories attached to the sling bar 136 of the person lifting device. As shown in FIG. 5, the person lifting device may include multiple pairs of coupling detectors (such as coupling detectors 260A, 260B and 261A, 261B) with each pair generally corresponding to a pair of lifting hooks on a sling bar, and each individual coupling detector operatively associated with a specific lifting hook via the electronic control unit. For example, the person lifting device may contain one, two or even more pairs of coupling detectors to accommodate sling bars of various designs and numbers of lifting hooks.

Figure 6:
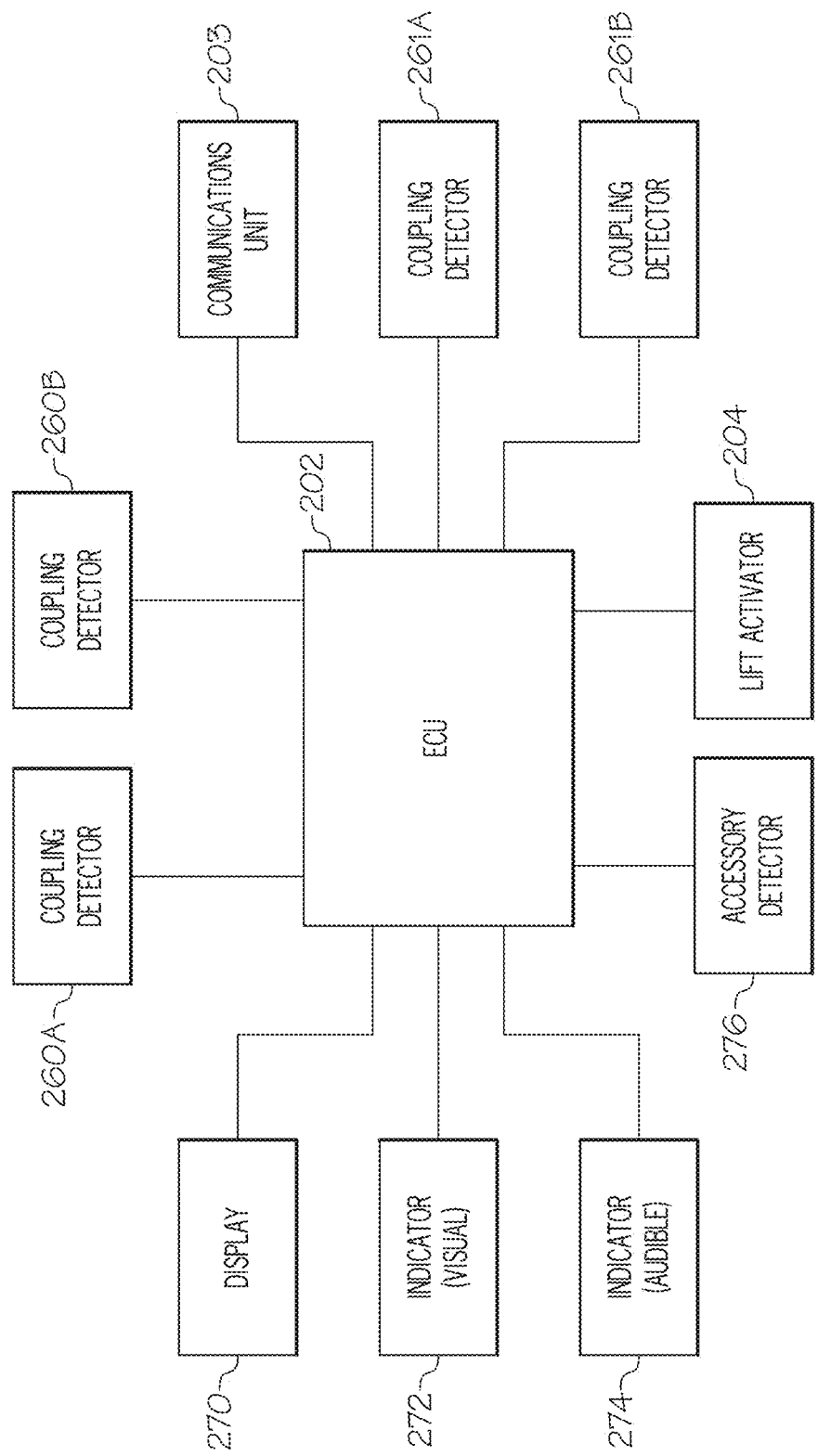
FIG. 6 schematically depicts the interconnectivity of various electrical components of a person lifting device according to one or more embodiments shown and described herein.

Referring now to FIG. 6, one embodiment of an electronic control unit 202 for use with the person lifting device 100 of FIGS. 1A and 1B, or the person lifting device 300 of FIG. 2, is schematically depicted. The electronic control unit 202 includes a processor (not shown) and a non-transient memory (not shown) which stores computer readable and executable instructions which, when executed by the processor, facilitate the operation of the person lifting device 100, 300. In the embodiments described herein, the electronic control unit 202 is communicatively coupled (either wired or wirelessly) to the coupling detectors 260A, 260B of the person lifting device 100, 300 and, optionally the coupling detectors 261A, 261B of the person lifting device 100, 300, facilitating the receipt of data (e.g., the identification of accessory coupling members connected with the sling bar) from the coupling detectors for storage and further processing by the electronic control unit 202. In addition, the electronic control unit 202 is communicatively coupled to the lift actuator 204, facilitating control of the lift actuator 204 by and through the electronic control unit 202 and enabling a person attached to the person lifting device 100, 300 to be raised and/or lowered. In addition, the electronic control unit 202, 402 may be communicatively coupled to a display 270, such as an LCD or LED display, facilitating the display of lift data from the electronic control unit 202. For example, the electronic control unit 202 may display information on the display 270 relating to the type of lift accessories attached to the person lifting device, operating constraints of the person lifting device such as weight limit, lift height, etc., number of lifts performed, service required, and the like. In addition, a visual indicator 272 and/or an audible indicator 274 may be communicatively coupled to the electronic control unit 202 and may be used to provide feedback to an operator of the lift. Such feedback may include, for example, visual and/or audible indications of whether the correct sling bar and accessories are attached to the person lifting device, whether a battery of the lifting device is fully charged, whether the accessories are properly connected to the sling bar of the person lifting device, and the like. In embodiments, the visual indicator 272 and/or audible indicator may be, for example, attached to the lift arm 106 of the person lifting device 100 depicted in FIGS. 1A and 1B, or may be attached to the lift unit 304 of the person lifting device 300 depicted in FIG. 2. The electronic control unit 202 may also be communicatively coupled to the accessory detector 276 facilitating the receipt of data related to the identity of accessories attached to the person lifting apparatus.

The electronic control unit 202 may also be communicatively coupled (either wired or wirelessly) to a communications unit 203. In some embodiments, the communications unit 203 may be integral with the electronic control unit 202. The communications unit 203 may communicatively couple the electronic control unit 202 to a variety of devices through wires or wirelessly. For example, the communications unit 203 may communicatively couple the electronic control unit 202 to a central server (not depicted) of a healthcare facility such that the electronic control unit 202 may send and/or receive signals from the central server. The communications unit 203 may communicate the type of lift accessories attached to the person lifting device, service required, patient data, and the like to the central server. The central server may include any suitable electronic device for sending, receiving, and storing information, such as a computing device, a PDA, a cell phone, and/or a cloud computing device.

Figure 7:
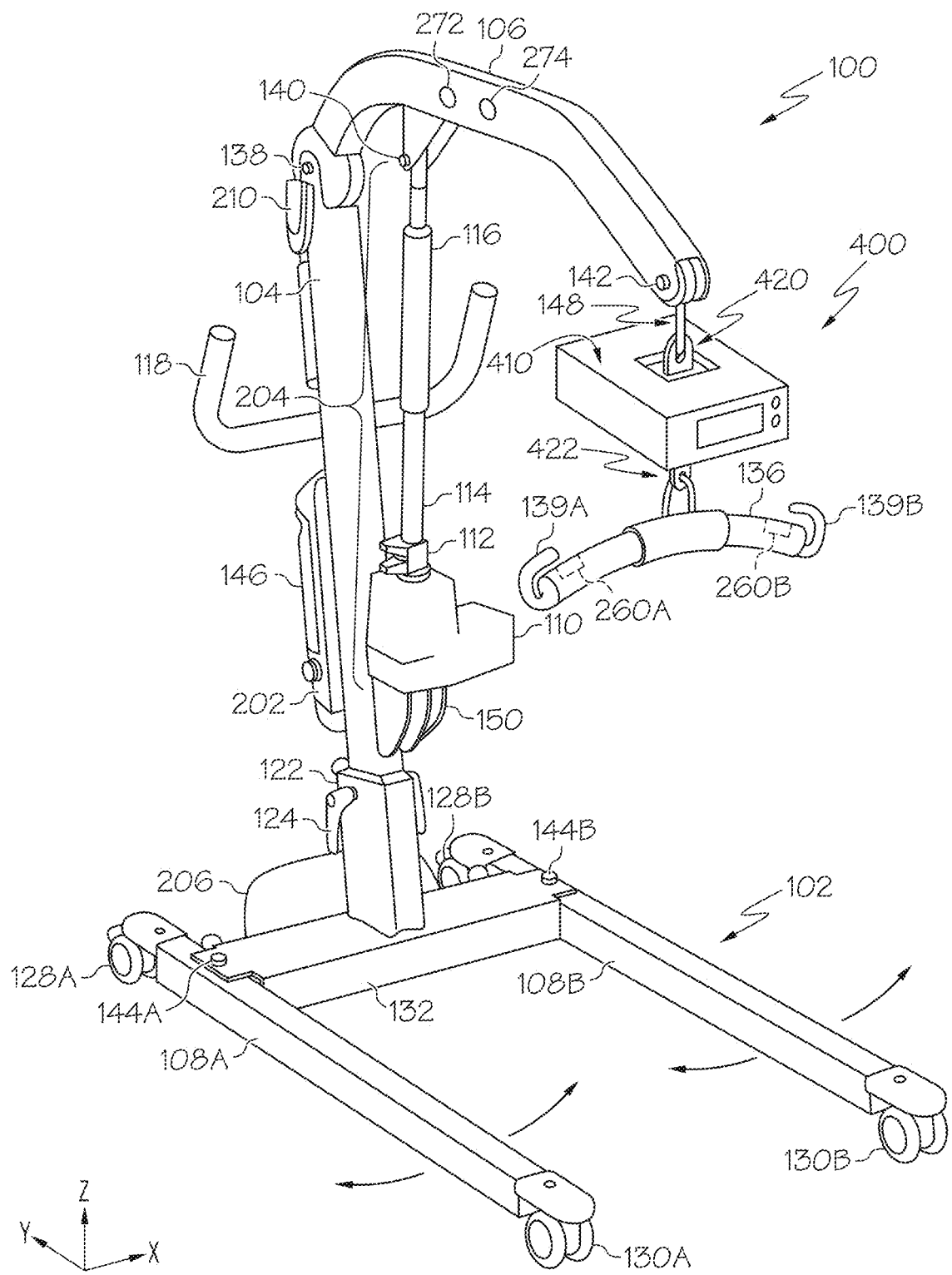
FIG. 7 schematically depicts a scale assembly coupled to a person lifting device according to one or more embodiments shown and described herein.

Referring now to FIG. 7, in embodiments, the sling bar 136 is coupled to a person lifting device 100 through a scale assembly 400. The scale assembly 400 includes an upper coupling 420 that is selectively coupled to the coupling member 148 of the person lifting device 100, and a lower coupling 422 that is selectively coupled to a sling bar 136 such that the scale assembly 400 is positioned between and coupled to the coupling member 148 and the sling bar 136 in the vertical direction. By selectively coupling the scale assembly 400 to the sling bar 136 and the person lifting device 100, the upper coupling 420 and the lower coupling 422 allow a user or caregiver to install the scale assembly 400 between remove the scale assembly 400 from between the person lifting device 100 and the sling bar 136. While the scale assembly 400 is depicted as being coupled to the coupling member 148 of the person lifting device 100, it should be understood that the scale assembly 400 may similarly be coupled to the person lifting device 300 depicted in FIG. 2, or any other suitable person lifting device. The scale assembly 400 may perform a variety of functions, including determining a force applied to the scale assembly 400 in the vertical direction, which may be indicative of a patient's weight, and may meet certain standards such as Non-Automatic Weighing Instrument (NAWI) standards and Medical Device Directive (MDD) standards.

Referring to FIG. 8, an enlarged perspective view of the scale assembly 400 is depicted in isolation. The upper coupling 420 is coupled to an upper member 412 that is positioned at least partially within an outer housing 410 of the scale assembly 400. The lower coupling 422 is coupled to a lower member 414 (FIG. 9A) that is positioned at least partially within the outer housing 410 of the scale assembly 400. Alternatively, the upper coupling 420 may be integral with the upper member 412, and the lower coupling 422 may be integral with the lower member 414.

In the embodiment depicted in FIG. 8, the scale assembly 400 includes an electronic control unit 402. The electronic control unit 402 is operatively coupled to the scale assembly 400 and is a standalone controller. By including the electronic control unit 402 as a standalone controller, the scale assembly 400 may be utilized with different person lifting devices 100, 300 and may operate independently of the person lifting devices 100, 300. In other embodiments, the electronic control unit 402 may be integral with and/or communicatively coupled (wired or wirelessly) to the electronic control unit 202 of the person lifting devices 100, 300.

The scale assembly 400 may further comprise an accessory detector 476, such as a bar code scanner, QR code reader, RFID tag reader or the like, communicatively coupled to the electronic control unit 402. The accessory detector 476 may be used to detect the identity of accessories coupled to the scale assembly 400 and, in conjunction with the electronic control unit 402, determine the compatibility of the accessories, as will be described in further detail herein. For example, in the embodiment of the scale assembly 400 depicted in FIG. 8, the accessory detector 476 is a bar code scanner communicatively coupled to the electronic control unit 402. In this embodiment, the bar code scanner may be utilized by a caregiver to scan accessories and sling bars attached to the scale assembly 400 and store the identification of these accessories and sling bars in memory. In alternative embodiments, the accessory detector 476 may be an RFID tag reader positioned on the scale assembly 400 with an active region that envelopes the scale assembly 400. However, the active region may be shaped through the use of appropriate antennas and readers such that only RFID tagged components attached to the scale assembly 400 are identified by the accessory detector 476. The accessory detector 476 may include, for example, CS468 RFID reader and a CS790 antenna available from Convergence Systems Ltd. of Hong Kong which may be used in conjunction with one another to shape the active area of the accessory detector 476. However, it should be understood that other RFID readers and antennas suitable for shaping the active area of the accessory detector 476 may be used.

Referring to FIGS. 9A and 9B, a cross-section and a side view of the scale assembly 400 is depicted with the outer housing 410 removed, respectively. The scale assembly 400 includes at least one force sensor 450 that is coupled to the upper member 412 and the lower member 414. In the embodiment depicted in FIG. 9A, the scale assembly 400 includes two force sensors 450 that are coupled to the upper member 412 and the lower member 414, however, it should be understood that the scale assembly 400 may include any suitable number of force sensors 450 coupled to the upper member 412 and the lower member 414. The upper member 412 and the lower member 414 are detached and spaced apart from one another in the vertical direction and are coupled to one another through the force sensors 450. Accordingly, when a force is applied to the lower member 414 in the vertical direction, such as when a patient is secured to a person lifting device 100, 300 through the scale assembly 400, the force may be transmitted to the upper member 412 through the force sensors 450. Similarly, when a force is applied to the upper member 412 in the vertical direction, the force may be transmitted to the lower member 414 through the force sensors 450.

The force sensors 450 detect force applied to the force sensors 450 in the vertical direction and may output a signal indicative of the force applied to the force sensors 450. When a person is secured to a person lifting device 100, 300 through the scale assembly 400, the force applied to the force sensors 450 may be indicative of the person's weight. Referring to FIG. 9B, the force sensors 450 include an S-type load cell. Alternatively, the force sensors 450 may include any suitable sensor, including, but not limited to, a tension link load cell, a strain gauge, or the like.

Referring to FIGS. 8 and 9A collectively, the force sensors 450 are communicatively coupled (wired or wirelessly) to the electronic control unit 402. In operation, the force sensors 450 output a signal to the electronic control unit 402 that is indicative of a force applied to the force sensors 450 in the vertical direction, which may be indicative of a weight of a patient positioned in a sling that is coupled to the scale assembly 400. The electronic control unit 402 is communicatively coupled (wired or wirelessly) to a display 470, such as an LCD or LED display, which may display an image indicating a detected weight of the patient based on the detected force on the force sensors 450. In this way, the scale assembly 400 may provide a visual indication of the detected weight of a patient who is positioned in a sling that is coupled to the scale assembly 400.

Referring again to FIG. 9A, the upper member 412 includes an outer portion or outer portions 430 and a recessed portion 432 that is offset from the outer portions 430. When the upper member 412 is assembled to the scale assembly 400, the recessed portion 432 is positioned below the outer portions 430 in the vertical direction. The outer portions 430 of the upper member 412 are also positioned laterally and/or longitudinally outward from the recessed portion 432 when the upper member 412 is assembled to the scale assembly 400. The upper coupling 420 is coupled to the upper member 412 at the recessed portion 432, and at least a portion of the upper coupling 420 is positioned below the outer portions 430 of the upper member 412 in the vertical direction. In some embodiments, the upper coupling 420 is positioned entirely below the outer portions 430 of the upper member 412 in the vertical direction.

Similarly, the lower member 414 includes an outer portion or portions 434 and a recessed portion 436 that is offset from the outer portions 434. When the lower member 414 is assembled to the scale assembly 400, the recessed portion 436 is positioned above the outer portions 434 in the vertical direction. The outer portions 434 of the lower member 414 are also positioned laterally and/or longitudinally outward from the recessed portion 436 when the lower member 414 is assembled to the scale assembly 400. The lower coupling 422 is coupled to the lower member 414 at the recessed portion 436, and at least a portion of the lower coupling 422 is positioned above the outer portions 434 of the lower member 414 in the vertical direction. In some embodiments, the lower coupling 422 is positioned entirely above the outer portions 434 of the lower member 414 in the vertical direction.

In the embodiment depicted in FIG. 9A, the force sensors 450 are coupled to the outer portion 430 of the upper member 412 and the outer portion 434 of the lower member 414. Accordingly, the force sensors 450 are positioned laterally and/or longitudinally outward of the upper coupling 420 and the lower coupling 422, which are coupled to the upper member 412 and the lower member 414 at the recessed portions 432, 436, respectively. By positioning the force sensors 450 outward of the upper coupling 420 and the lower coupling 422, a distance 10 between the upper coupling 420 and the lower coupling 422 in the vertical direction may be minimized, where the distance 10 is evaluated between a location where the coupling member 148 (FIG. 7) is selectively coupled to the upper coupling 420 and a location where the sling bar 136 (FIG. 7) is selectively coupled to the lower coupling 422. In the embodiment depicted in FIG. 9A, the distance 10 may be 50 mm or less.

As shown in FIG. 7, by minimizing the distance between the upper coupling 420 and the lower coupling 420, a distance between the coupling member 148 and the sling bar 136 may be minimized when the scale assembly 400 is coupled to the person lifting device 100. In this way, the distance in the vertical direction between the coupling member 148 and the sling bar 136 when the scale assembly 400 is coupled to the person lifting device 100, as shown in FIG. 7, may be similar to the distance between the coupling member 148 and the sling bar 136 when the sling bar 136 is coupled to the coupling member 148, as shown in FIG. 1A. Accordingly, the person lifting device 100 may operate in a similar manner, and in particular may operate within a similar vertical range, when the scale assembly 400 is coupled to the person lifting device 100 as compared to when the sling bar 136 is coupled to the coupling member 148.

Figure 10:
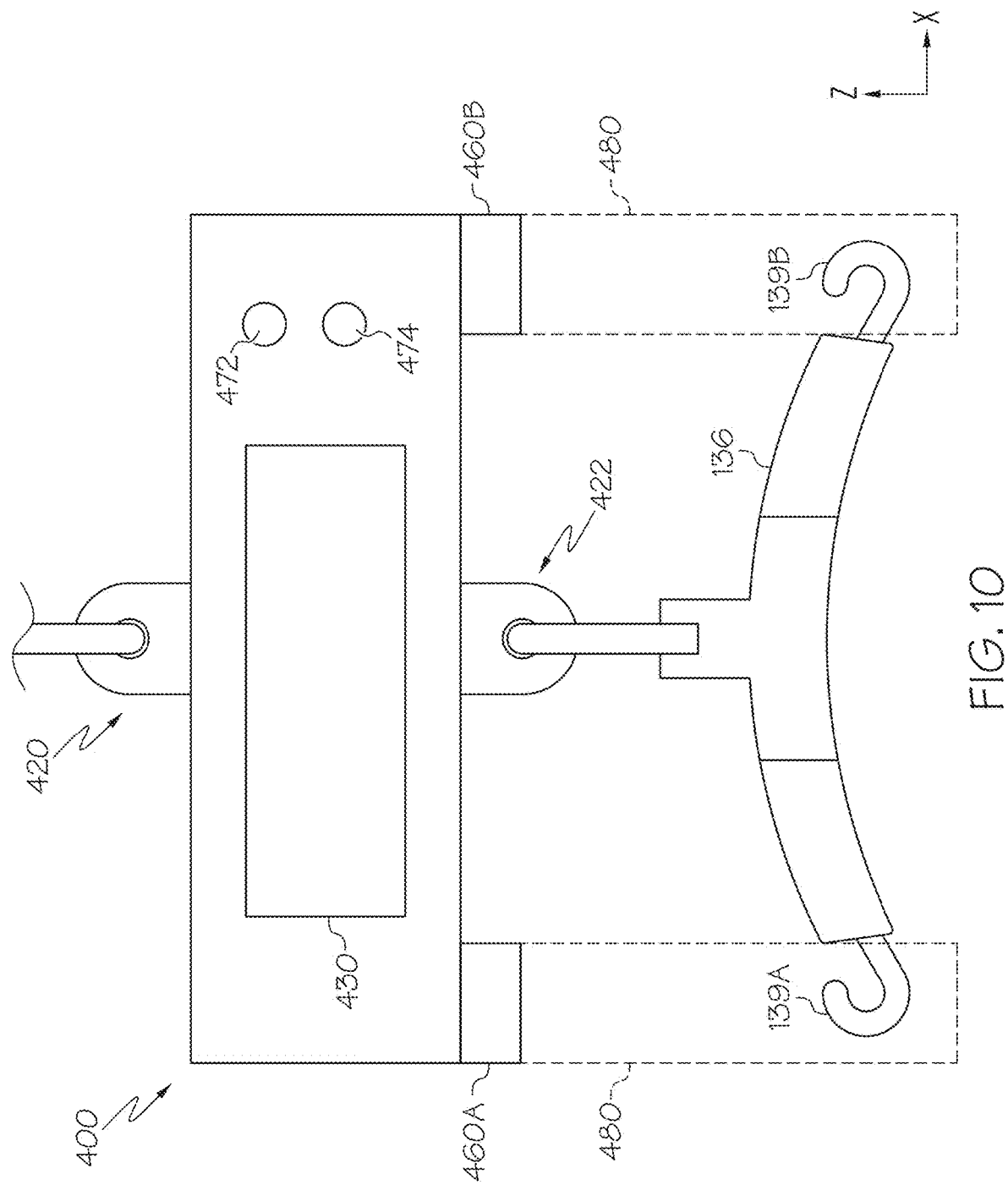
FIG. 10 schematically depicts coupling detectors attached to a scale assembly according to one or more embodiments shown and described herein.

Referring now to FIG. 10, in embodiments, coupling detectors 460A, 460B may be operatively coupled to the outer housing 410 or other structural component of the scale assembly 400. The coupling detectors 460A, 460B are communicatively coupled to the electronic control unit 402, either by wire or wirelessly. In these embodiments, the coupling detectors 460A, 460B are RFID readers which utilize evanescent wave technology to produce a shaped and constrained active area 480 within which an RFID tag can be interrogated by the RFID reader. In these embodiments, the coupling detectors 460A, 460B may include a CS468 RFID reader and a CS790 antenna available from Convergence Systems Ltd. of Hong Kong which may be used in conjunction with one another to shape the active areas of the coupling detectors. However, it should be understood that other RFID readers and antennas suitable for shaping the active area of the reader may be used. In these embodiments, the active areas 480 of the coupling detectors 460A, 460B extend from the coupling detectors a distance to sufficient to envelope the end portions of the sling bar 136, including the lifting hooks 139A, 139B, so that the coupling detectors 460A, 460B are able to interrogate an RFID tag attached to an accessory coupling member engaged with the corresponding lifting hooks 139A, 139B. However, due to the shape and constraint of the active areas 480, the coupling detectors 460A, 460B do not detect or interrogate RFID tags located outside the active areas 480, thereby avoiding mis-detection and mis-interrogation of RFID tags which are not associated with accessories attached to the sling bar 136 of the person lifting device. The scale assembly 400 device may include multiple pairs of coupling detectors in addition to the coupling detectors 460A, 460B, with each pair generally corresponding to a pair of lifting hooks on a sling bar, and each individual coupling detector operatively associated with a specific lifting hook via the electronic control unit. For example, the person lifting device may contain one, two or even more pairs of coupling detectors to accommodate sling bars of various designs and numbers of lifting hooks.

Figure 11:
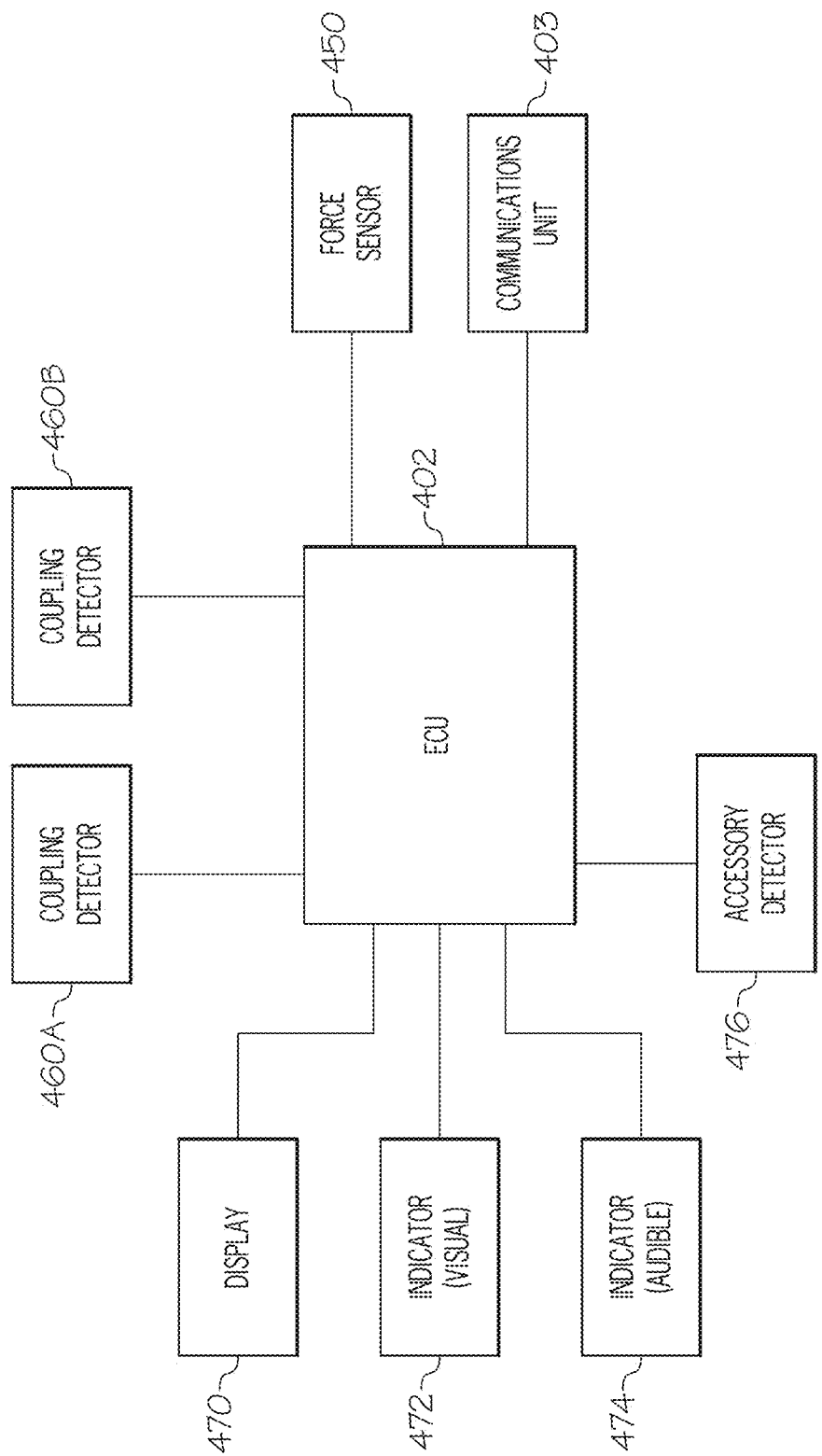
FIG. 11 schematically depicts the interconnectivity of various electrical components of a person lifting device according to one or more embodiments shown and described herein.

Referring now to FIG. 11, one embodiment of an electronic control unit 402 for use with the scale assembly 400 of FIG. 8 is schematically depicted. The electronic control unit 402 includes a processor (not shown) and a non-transient memory (not shown) which stores computer readable and executable instructions which, when executed by the processor, facilitate the operation the scale assembly 400. As described above, the force sensor or force sensors 450 are communicatively coupled (wired or wirelessly) to the electronic control unit 402 and the force sensors 450 send signals to the electronic control unit 402 indicative of force applied to the force sensors 450. In the embodiments described herein, the electronic control unit 402 is communicatively coupled to the coupling detectors 460A, 460B of scale assembly 400, facilitating the receipt of data (e.g., the identification of accessory coupling members connected with the sling bar) from the coupling detectors for storage and further processing by the electronic control unit 402. In addition, as described above, the electronic control unit 402 may be communicatively coupled to the display 470, facilitating the display of the detected weight of the patient and other information related to the patient and/or the lift. For example, the electronic control unit 402 may display information on the display 470 relating to the type of lift accessories attached to the person lifting device, service required, patient data, and the like. In addition, a visual indicator 472 and/or an audible indicator 474 may be communicatively coupled to the electronic control unit 402 and may be used to provide feedback to an operator of the scale assembly. Such feedback may include, for example, visual and/or audible indications of whether the correct sling bar and accessories are attached to the scale assembly, whether a battery of the scale assembly 400 is fully charged, whether the accessories are properly connected to the sling bar of the person lifting device, and the like. In embodiments, the visual indicator 472, the audible indicator 474, and/or the display 470 may be, for example, attached to the outer housing 410 of the scale assembly 400, as shown in FIG. 8. The electronic control unit 402 may also be communicatively coupled to the accessory detector 476, facilitating the receipt of data related to the identity of accessories attached to the person lifting apparatus.

The electronic control unit 402 may also be communicatively coupled (either wired or wirelessly) to a communications unit 403. In some embodiments, the communications unit 403 may be integral with the electronic control unit 402. The communications unit 403 may communicatively couple the electronic control unit 402 to a variety of devices through wires or wirelessly. For example, as described above, the electronic control unit 402 of the scale assembly 400 may be communicatively coupled to the electronic control unit 202 of the person lifting device 100, 300 of FIGS. 1A and 2. The communications unit 403 may also communicatively couple the electronic control unit 402 to various electronic devices and networks, such as a central server (not depicted) of a healthcare facility such that the electronic control unit 402 may send and/or receive signals from the central server. By communicatively coupling the electronic control unit 402 to a central server, the electronic control unit 402 may communicate the type of lift accessories attached to the person lifting device, detected patient weight, service required, patient data, and the like. As described above, the central server may include any suitable electronic device for sending, receiving, and storing information, such as a computing device, a PDA, a cell phone, and/or a cloud computing device.

Figure 12:
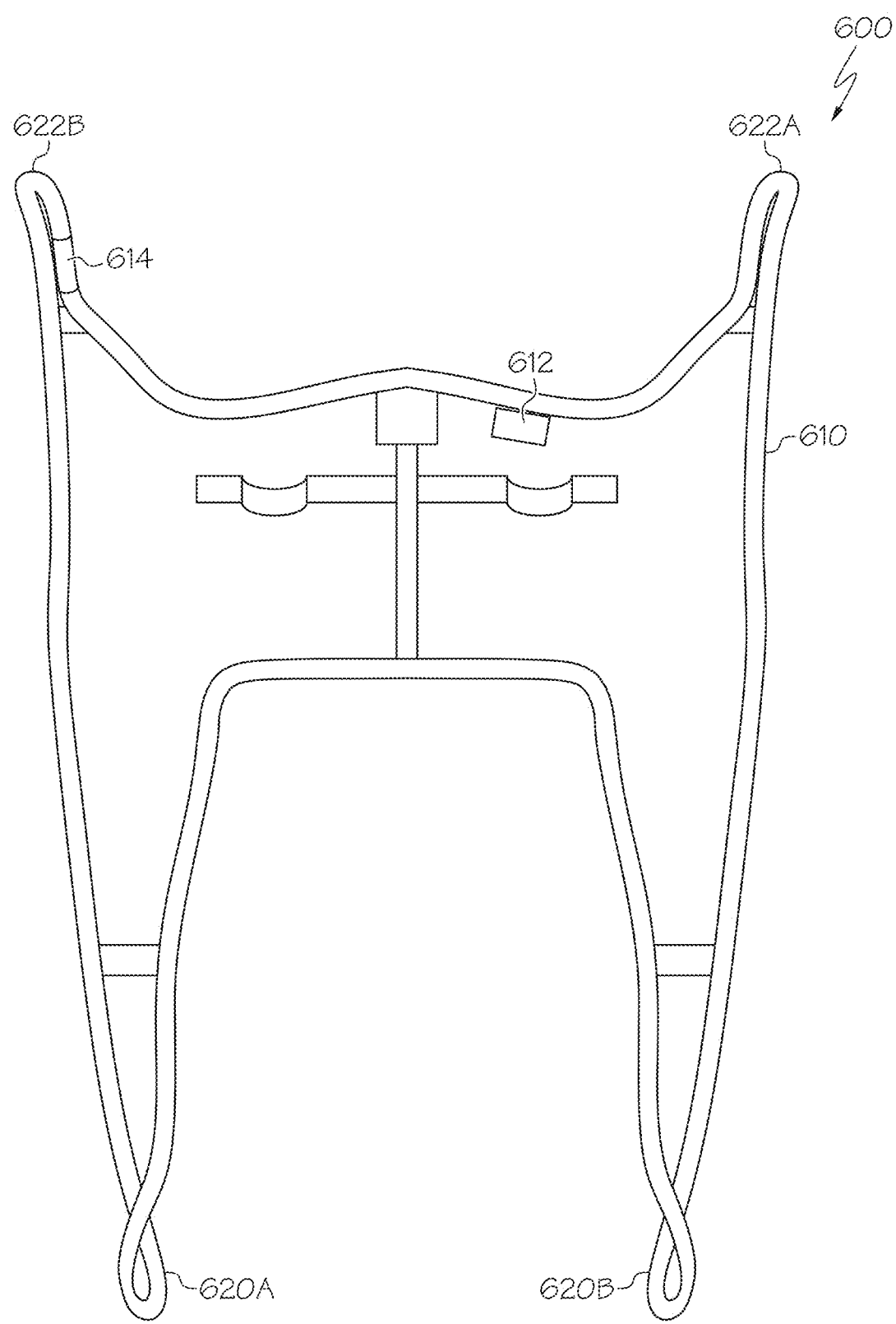
FIG. 12 schematically depicts an accessory, specifically a lift sling, for attachment to a person lifting device according to one or more embodiments shown and described herein.

Referring now to FIG. 12, one embodiment of an accessory 600 for attachment to the sling bar 136 of the person lifting devices described herein is schematically depicted. In the embodiment depicted in FIG. 12, the accessory 600 is a lifting sling. However, it should be understood that other types of accessories are contemplated including, but not limited to, straps, vests, harnesses, repositioning sheets, and the like. The accessory 600 includes a body 610 and a plurality of accessory coupling members 620A, 620B, 622A, 622B for attaching the accessory to the lifting hooks of a sling bar. In embodiments, the accessory 600 may have identifying indicia 612 affixed to the accessory 600, such as, for example, to the body 610 of the accessory 600. The identifying indicia 612 may be utilized to track the usage and maintenance of the accessory 600. The identifying indicia 612 may also facilitate identification of the accessory 600 to determine if a specific accessory 600 is compatible with a particular sling bar 136 (FIG. 1A) or a particular patient, as will be described in greater detail herein. The identifying indicia 612 may be, for example, a bar code, a QR code, an RFID tag, or the like and may have encoded thereon an identification of the accessory 600 such as a model number and/or serial number. In embodiments, the accessory coupling members 620A, 620B, 622A, 622B of the accessory 600 may be attached to a sling bar in a certain, predetermined configuration to facilitate proper lifting. For example, and without limitation, in the embodiment of the accessory 600 depicted in FIG. 12, the accessory 600 is intended for attachment to a two point sling bar, such as sling bar 136 depicted in FIG. 1A, with accessory coupling members 620A and 622A coupled to one lifting hook and accessory coupling members 620B, 622B attached to the other lifting hook. In order to insure proper attachment, each of the accessory coupling members 620A, 620B, 622A, 622B may have unique identifying indicia (not shown) affixed thereto which allows for the identity of the accessory coupling member to be automatically determined upon connection to a lifting hook of a sling bar and the identity to be checked against an array of compatible accessory coupling members for the attachment location. Suitable identifying indicia may be, for example, a bar code, a QR code, an RFID tag, or the like and may have encoded thereon a unique identifier for the corresponding accessory coupling member.

In some embodiments, the accessory 600 may also include a counter 614 that is positioned on the accessory 600. The counter 614 may detect usage of the accessory 600, such as when the accessory 600 is washed and when the accessory 600 is placed under load by supporting a patient.

Figure 13:
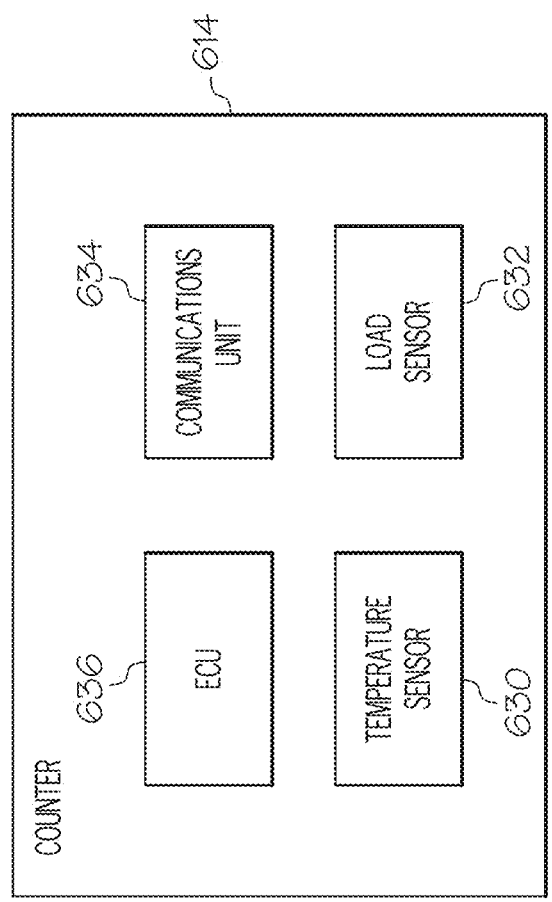
FIG. 13 schematically depicts a counter of the accessory of FIG. 12 according to one or more embodiments shown and described herein.

Referring to FIG. 13, the counter 614 includes a temperature sensor 630, a load sensor 632, and a communications unit 634 that are communicatively coupled (wired or wirelessly) to an electronic control unit 636. The load sensor 632 detects a load or force applied to the counter 614, which may be indicative of a load or force placed on the accessory 600. When the detected load applied to the counter 614 exceeds a predetermined load, the load sensor 632 may send a signal to the electronic control unit 636. In embodiments, the predetermined load may be selected such that detected forces above the predetermined load may be indicative that the accessory 600 is being utilized to support a patient. For example and without limitation, in some embodiments, the predetermined load is greater than 20 kg. In other embodiments, the predetermined load is greater than 10 kg. As used herein, the term "lift cycle" is used to refer a single occurrence in which the load sensor 632 detects a load that exceeds the predetermined load.

The temperature sensor 630 detects a temperature of the counter 614 and may send a signal to the electronic control unit 636 when the detected temperature exceeds a predetermined temperature. In embodiments, the predetermined temperature may be selected such that detected temperatures above the predetermined temperature may be indicative that the accessory 600 is being washed, such as by a washing machine. For example and without limitation, in some embodiments, the predetermined temperature may be greater than 55° C. In other embodiments, the predetermined temperature is greater than 40° C. As used herein, the term "wash cycle" is used to refer to a single occurrence in which the temperature sensor 6430 detects a temperature that is greater than the predetermined temperature.

Accordingly, the electronic control unit 636 may receive signals from the load sensor 632 and the temperature sensor 630 that are indicative of the accessory 600 being used to support a patient and of the accessory 600 being washed, respectively. The electronic control unit 636 may collect and store this information such that the electronic control unit 636 may contain a history of the lift cycles and wash cycles that an accessory 600 has been subjected to. The communications unit 634 may communicate the history of the lift cycles and/or the wash cycles of a specific accessory 600, through a wired or wireless connection, to a central server (not depicted) or other electronic device, such that a caregiver may monitor the usage and wear of the accessory 600.

Methods of operating the person lifting devices 100, 300 of FIGS. 1A-1B and 2 and/or the scale assembly 400 of FIG. 7 will now be described in further detail with reference to FIGS. 1A-13.

In the embodiments described herein, the memory of the electronic control unit 202 of the person lifting device 100, 300 and the electronic control unit 402 of the scale assembly 400 contain a computer readable and executable instruction set which, when executed by the processor, automatically determines if an accessory 600 is properly connected to the sling bar 136 of the person lifting device 100, 300 and, if the accessory 600 is not properly connected, the electronic control unit 202, 402 provides a user with a visual and/or audible warning and, in some embodiments, may lock-out the actuation controls of the person lifting device 100, 300 to prevent the person lifting device 100, 300 from being used until the controls are unlocked or an appropriate override code is entered.

In some embodiments, the method of operating the person lifting device, such as the person lifting devices 100, 300 depicted in FIGS. 1A and 2, includes the preliminary step of determining if compatible accessories are attached to the person lifting device 100, 300. For example, the electronic control unit 202, 402 may prompt a user, such as with the display 270, 470, to scan an identification tag associated with the sling bar 136, such as a bar code, QR code, or the like, encoded with a model number and/or serial number of the sling bar 136, with the accessory detector 276, 476. Alternatively, the electronic control unit 202, 402 may automatically detect an RFID tag associated with the sling bar 136 attached to the person lifting device 100, 300, such as when the accessory detector 276, 476 is an RFID tag reader. Thereafter, the electronic control unit 202, 402 stores this identification in memory as the attached sling bar 136. The electronic control unit 202, 402 then prompts the user, such as with the display 270, 470 to scan the identifying indicia 612 on the accessory 600 and stores the identification of the accessory 600 in memory. Alternatively, the electronic control unit 202, 402 may automatically detect an RFID tag associated with the accessory 600 attached to the person lifting device, such as when the accessory detector 276, 476 is an RFID tag reader and the identifying indicia is an RFID tag.

The electronic control unit 202, 402 then automatically compares the identification of the accessory 600 with an array of one or more compatible accessories associated with the identification of the sling bar 136 and stored in the memory. For example, the array of one or more compatible accessories associated with the identification of the sling bar may include a look-up table of the identification of accessories indexed according to the identification of the sling bars with which they are compatible. If the identification of the accessory is not in the array of compatible accessories, then the electronic control unit 202, 402 provides a warning signal, such as with the display 270, 470, the visual indicator 272, 472, and/or the audible indicator 274, 474.

For example, in one embodiment, the electronic control unit 202, 402 may illuminate the visual indicator 272, 472 as red to indicate that the sling bar 136 and accessory 600 are not compatible with one another. In some embodiments, the electronic control unit 202 may lock-out the actuation controls of the person lifting device 100, 300 when the identification of the accessory is not in the array of compatible accessories to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when the identification of the accessory is not in the array of compatible accessories. In embodiments, if the identification of the accessory is in the array of compatible accessories, then the electronic control unit 202, 402 provides a signal, such as with the display 270, 470, the visual indicator 272, 472, and/or the audible indicator 274, 474. For example, in one embodiment, the electronic control unit 202, 402 may illuminate the visual indicator 272, 472 as green to indicate that the sling bar 136 and accessory 600 are compatible with one another.

In some embodiments, the method of operating the person lifting device 100, 30 includes the preliminary step of determining if the accessories are attached to the person lifting device 100, 300 are being utilized with the correct patient. For example, the electronic control unit 202, 402 may prompt a user, such as with the display 270, 470 to scan the identifying indicia 612 on the accessory 600 and stores the identification of the accessory 600 in memory. Alternatively, the electronic control unit 202, 402 may automatically detect an RFID tag associated with the accessory 600 attached to the person lifting device, such as when the accessory detector 276, 476 is an RFID tag reader and the identifying indicia 612 is an RFID tag.

The electronic control unit 202, 402 then automatically compares the identification of the accessory 600 with a patient profile stored in memory. For example, a particular patient profile may include a look-up table of the identification of accessories indexed according use by that particular patient. If the identification of the accessory 600 is not in the array of accessories in the patient profile, then the electronic control unit 202, 402 provides a warning signal, such as with the display 270, 470, the visual indicator 272, 472, and/or the audible indicator 274, 474. For example, in one embodiment, the electronic control unit 202, 402 may illuminate the visual indicator 272, 472 as red to indicate that accessory 600 is not intended for use with that particular patient according to the patient's profile stored in memory. In some embodiments, the electronic control unit 202 may lock-out the actuation controls of the person lifting device 100, 300 when the identification of the accessory 600 is not in the patient profile to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when the identification of the accessory is not in the array of accessories in the patient profile. In embodiments, if the identification of the accessory is in the patient profile, then the electronic control unit 202, 402 provides a signal, such as with the display 270, 470, the visual indicator 272, 472, and/or the audible indicator 274, 474. For example, in one embodiment, the electronic control unit 202, 402 may illuminate the visual indicator 272, 472 as green to indicate that the accessory 600 is not in the patient profile.

In some embodiments, the method of operating the person lifting device 100, 300 includes the preliminary step of determining if the accessory 600 has exceeded a predetermined number of lift cycles and/or wash cycles. In embodiments where the accessory 600 includes a counter 614, the counter 614 may communicate information related to the lift cycles and/or wash cycles of the accessory 600 to the electronic control unit 202, 402.

Alternatively, in embodiments where the accessory 600 does not include a counter 614, prior to operation of the person lifting device 100, 300, the electronic control unit 202, 402 may prompt the user, such as with the display 270, 470 to scan the identifying indicia 612 on the accessory and may store in the memory that the identifying indicia 612 was scanned. In embodiments where the accessory detector 276, 476 is an RFID tag reader and the identifying indicia is an RFID tag, prior to operation of the person lifting device 100, 300, the electronic control unit 202, 402 may automatically detect an RFID tag associated with the accessory 600 attached to the person lifting device. Each instance that the identifying indicia 612 is scanned or detected prior to operation of the person lifting device 100, 300 may be stored in memory of the electronic control unit 202, 402 as a lift cycle associated with the particular accessory 600.

To determine the number of wash cycles associated with an accessory 600 in embodiments where the accessory 600 does not include a counter 614, prior to operation of the person lifting device 100, 300, the electronic control unit 202, 402 may prompt the user, such as with the display 270, 470 to scan the identifying indicia 612. Upon scanning the identifying indicia 612, the electronic control unit 202 402 may communicate with a central server of a healthcare facility to determine the number of wash cycles associated with an accessory 600. For example, caregivers may scan or detect the identifying indicia 612 of the accessory 600 prior to washing the accessory, and may communicate a signal to the central server to indicate that the accessory 600 has been washed. The central server may store the number of wash cycles associated with the accessory 600 and may communicate the number of wash cycles to the electronic control unit 202, 402.

Whether the lift cycles and/or wash cycles associated with the accessory 600 are determined using the counter 614 or through the scanning or detecting the identifying indicia 612, if the electronic control unit 202, 402 detects that the lift cycles and/or wash cycles associated with an accessory 600 exceed a predetermined maximum number of lift cycles and/or wash cycles, then the electronic control unit 202, 402 provides a warning signal, such as with the display 270, 470, the visual indicator 272, 472, and/or the audible indicator 274, 474. For example, in one embodiment, the electronic control unit 202, 402 may illuminate the visual indicator 272, 472 as red to indicate the lift cycles and/or wash cycles associated with the accessory 600 exceeds a predetermined maximum number of lift cycles and/or wash cycles. In some embodiments, the electronic control unit 202 may lock-out the actuation controls of the person lifting device 100, 300 when the lift cycles and/or wash cycles associated with an accessory 600 exceed the predetermined maximum lift cycles and/or wash cycles to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when the lift cycles and/or wash cycles associated with the accessory 600 exceed the predetermined maximum number of lift cycles and/or wash cycles. In embodiments, if the lift cycles and/or the wash cycles associated with the accessory 600 do not exceed the predetermined maximum lift cycles and/or wash cycles, then the electronic control unit 202, 402 provides a signal, such as with the display 270, 470, the visual indicator 272, 472, and/or the audible indicator 274, 474. For example, in one embodiment, the electronic control unit 202, 402 may illuminate the visual indicator 272, 472 as green (or maintain the illumination as green) to indicate that the number of lift cycles and/or wash cycles associated with the accessory does not exceed the predetermined maximum lift cycles and/or wash cycles.

In some embodiments, the method of operating the person lifting device 100, 300 includes the preliminary step of determining if all the accessory coupling members, such as the accessory coupling members 620A, 620B, 622A, 622B, of the accessory 600 are connected to lifting hooks 139A, 139B of the sling bar 136. For example, the electronic control unit 202, 402 may automatically determine a number of accessory coupling members associated with the identification of the accessory 600. The number of accessory coupling members associated with the identification of the accessory 600 may be, for example, stored in a memory of the electronic control unit 202, 402 in a look-up table indexed according to the identification of the accessory 600. In the embodiment of the accessory 600 depicted in FIG. 12, the number of accessory coupling members is four, for example. The electronic control unit 202, 402 then automatically determines how many accessory coupling members are attached to the sling bar 136 using the plurality of coupling detectors 260A, 260B, 460A, 460B. For example, the electronic control unit 202, 402 may detect the presence of one or more accessory coupling members attached to the lifting hooks 139A, 139B of the sling bar 136 using the unique identifier associated with the identifying indicia attached to each of the accessory coupling members. That is, when the identifying indicia are RFID tags and the coupling detectors 260A, 260B, 460A, 460B are RFID tag readers, the electronic control unit may detect the unique identity associated with each accessory coupling member with the RFID tag readers and, based on these unique identities, determine the number of accessory coupling members attached to the lifting hooks 139A, 139B of the sling bar 136. Thereafter, the electronic control unit 202, 402 automatically compares the number of accessory coupling members associated with the identification of the accessory and the number of attached accessory coupling members. When the number of accessory coupling members associated with the identification of the accessory 600 and the number of attached accessory coupling members are not equal, then the electronic control unit 202, 402 provides a warning signal, such as with the display 270, 470, the visual indicator 272, 472, and/or the audible indicator 274, 474.

For example, in one embodiment, the electronic control unit 202, 402 may illuminate the visual indicator 272, 472 as red to indicate that the number of accessory coupling members associated with the identification of the accessory 600 and the number of attached accessory coupling members are not equal. In some embodiments, the electronic control unit 202 may lock-out the actuation controls of the person lifting device 100, 300 when the number of accessory coupling members associated with the identification of the accessory 600 and the number of attached accessory coupling members are not equal to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when the number of accessory coupling members associated with the identification of the accessory 600 and the number of attached accessory coupling members are not equal. In embodiments, if the number of accessory coupling members associated with the identification of the accessory 600 and the number of attached accessory coupling members are equal, then the electronic control unit 202, 402 provides a signal, such as with the display 270, 470, the visual indicator 272, 472, and/or the audible indicator 274, 474. For example, in one embodiment, the electronic control unit 202, 402 may illuminate the visual indicator 272, 472 as green (or maintain the illumination as green) to indicate that the number of accessory coupling members associated with the identification of the accessory and the number of attached accessory coupling members are equal.

In some embodiments, the electronic control unit 202, 402 determines if each of the accessory coupling members of the accessory 600 are attached to the appropriate lifting hook 139A or 139B of the sling bar 136 using the coupling detectors 260A, 260B, and/or the coupling detectors 460A, 460B of the scale assembly 400 and the unique identifier associated with each of the accessory coupling members. For example, in one embodiment, the coupling detectors 260A, 260B, 460A, 460B identify or are associated with a specific lifting hook 139A, 139B on the sling bar 136 in the memory of the electronic control unit 202, 402, while the accessory coupling members 620A, 620B, 622A, 622B of the accessory 600 have unique identifiers encoded on their respective identifying indicia which, in some embodiments, may also include the model and/or serial number of the accessory. This allows the electronic control unit 202, 402 to utilize the coupling detectors 260A, 260B, 460A, 460B to determine which accessory coupling members 620A, 620B, 622A, 622B are attached to which lifting hooks 139A, 139B with the coupling detectors 260A, 260B, 460A, 460B and, based on the identification of the accessory 600, determine if these connections are correct.

Referring to FIGS. 5-6 and 10-12, by way of example, in some embodiments, the electronic control unit 202, 402 detects an identification of an accessory coupling member attached to the lifting hook 139A of sling bar 136. The identification of the accessory coupling member is communicated to the electronic control unit 202, 402 by the coupling detector 260A, 460A as an electronic signal encoded with the identification of the accessory coupling member. For example, accessory 600 may be attached to sling bar 136 such that accessory coupling member 622B is attached to lifting hook 139A. The coupling detector 260A, 460A, which is related to the lifting hook 139A in the memory of the electronic control unit 202, 402, detects an identification of the accessory coupling member 622B by interrogating the unique identifying indicia attached to the accessory coupling member 622B and sends an electronic signal indicative of this identifying indicia to the electronic control unit 202, 402 thereby providing the electronic control unit 202, 402 with the identification of the accessory coupling member 622B attached to the lifting hook 139A.

In embodiments where the electronic control unit 202, 402 has detected an identification of the sling bar 136 and the accessory 600, the electronic control unit 202, 402 automatically compares the identification of the accessory coupling member with an array of one or more compatible accessory coupling members associated with the specific lifting hook 139A of the sling bar 136. The array of one or more compatible accessory coupling members associated with the lifting hook 139A of the sling bar 136 may be, for example, stored in the memory of the electronic control unit 202, 402, and linked to the identification of the sling bar 136. When the identification of the accessory coupling member is not in the array of compatible accessory coupling members, then the electronic control unit 202, 402 provides a warning signal, such as with the display 270, 470, the visual indicator 272, 472, and/or the audible indicator 274, 474. For example, in one embodiment, the electronic control unit 202, 402 may illuminate the visual indicator 272, 472 as red to indicate that the identification of the accessory coupling member is not in the array of compatible accessory coupling members. In some embodiments, the electronic control unit 202 may lock-out the actuation controls of the person lifting device 100, 300 when the identification of the accessory coupling member is not in the array of compatible accessory coupling members to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when the identification of the accessory coupling member is not in the array of compatible accessory coupling members. In embodiments, if the identification of the accessory coupling member is in the array of compatible accessory coupling members, then the electronic control unit 202, 402 provides a signal, such as with the display 270, 470, the visual indicator 272, 472 and/or the audible indicator 274, 474. For example, in one embodiment, the electronic control unit 202, 402 may illuminate the visual indicator 272, 472 as green (or maintain the illumination as green) to indicate that the identification of the accessory coupling member is in the array of compatible accessory coupling members. This process is then repeated for each accessory coupling member attached to the lifting hooks 139A, 139B of the sling bar 136.

In embodiments where the identifying indicia attached to the accessory coupling member 622B includes both the unique identification of the accessory coupling member 622B and the model number and/or serial number of the accessory 600, the electronic control unit 202, 402 automatically compares the identification of the accessory coupling member with an array of one or more compatible accessory coupling members indexed according to the lifting hook 139A and the identification of different sling bars compatible with the accessory 600. The array of one or more compatible accessory coupling members associated with the lifting hook 139A of the sling bar 136 may be, for example, stored in the memory of the electronic control unit 202, 402. For example, the accessory 600 may be compatible for use with different sling bars having different numbers and/or configurations of lifting hooks. Each of the lifting hooks of the different sling bars may be associated in the array with a specific coupling detector of the person lifting apparatus. Similarly, each of the lifting hooks of the different sling bars may be associated in the array with a specific accessory coupling member of a compatible accessory such as a sling. Based on these associations, the electronic control unit 202, 402 is able to determine if the accessory coupling member is properly connected to the lifting hook through a comparison of the identification of the accessory coupling member with the array of one or more compatible accessory coupling members associated with the lifting hook. When the identification of the accessory coupling member is not in the array of compatible accessory coupling members, then the electronic control unit 202, 402 provides a warning signal, such as with the display 270, 470, the visual indicator 272, 472, and/or the audible indicator 274, 474. For example, in one embodiment, the electronic control unit 202 may illuminate the visual indicator 272, 472 as red to indicate that the identification of the accessory coupling member is not in the array of compatible accessory coupling members. In some embodiments, the electronic control unit 202 may lock-out the actuation controls of the person lifting device 100, 300 when the identification of the accessory coupling member is not in the array of compatible accessory coupling members to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when the identification of the accessory coupling member is not in the array of compatible accessory coupling members. In embodiments, if the identification of the accessory coupling member is in the array of compatible accessory coupling members, then the electronic control unit 202, 402 provides a signal, such as with the display 270, 470, the visual indicator 272, 472 and/or the audible indicator 274, 474. For example, in one embodiment, the electronic control unit 202, 402 may illuminate the visual indicator 272, 472 as green (or maintain the illumination as green) to indicate that the identification of the accessory coupling member is in the array of compatible accessory coupling members. This process is then repeated for each accessory coupling member attached to the lifting hooks 139A, 139B of the sling bar 136.

In embodiments where the identifying indicia attached to the accessory coupling member of the accessory 600 includes both the unique identification of the accessory coupling member and the model number and/or serial number of the accessory 600, the electronic control unit 202, 402 may also verify that each of the accessory coupling members 620A, 620B, 622A, 622B are attached to a lifting hook. Specifically, the memory of the electronic control unit 202, 402 may include characteristics of accessories, such as the number of accessory coupling members and the like, indexed according to the model and/or serial number of the accessory 600. The electronic control unit 202, 402 may compare this information with the unique identifications of the accessory coupling members 620A, 620B, 622A, 622B as detected by the coupling detectors to determine if one or more of the accessory coupling members is not attached to a lifting hook of the sling bar. When it is determined that one or more of the accessory coupling members is not attached to a lifting hook of the sling bar, then the electronic control unit 202, 402 provides a warning signal, such as with the display 270, 470, the visual indicator 272, 472, and/or the audible indicator 274, 474. For example, in one embodiment, the electronic control unit 202, 402 may illuminate the visual indicator 272, 472 as red to indicate that one or more of the accessory coupling members is not attached to a lifting hook of the sling bar. In some embodiments, the electronic control unit 202 may lock-out the actuation controls of the person lifting device 100, 300 when one or more of the accessory coupling members is not attached to a lifting hook of the sling bar to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when one or more of the accessory coupling members is not attached to a lifting hook of the sling bar. In embodiments, if all the accessory coupling members are attached to a lifting hook of the sling bar, then the electronic control unit 202, 402 provides a signal, such as with the display 270, 470, the visual indicator 272, 472, and/or the audible indicator 274, 474. For example, in one embodiment, the electronic control unit 202, 402 may illuminate the visual indicator 272, 472 as green (or maintain the illumination as green) to indicate that all the accessory coupling members are attached to a lifting hook of the sling bar.

Still referring to FIGS. 5-6 and 10-12, in another embodiment, the electronic control unit 202, 402 detects an identification of the accessory coupling members attached to the lifting hooks 139A, 139B of sling bar 136. The identification of each accessory coupling member is communicated to the electronic control unit 202, 402 by the coupling detectors 260A, 260B, 460A, 460B as an electronic signal encoded with the identification of the accessory coupling member, as described above. The identification of each accessory coupling member may include, for example, a type of the accessory coupling member. In embodiments, the type of the accessory coupling member may include, for example, a general attachment location (left or right, front or back, etc.) of the sling bar 136 the accessory coupling member should be attached to. Alternatively, the type of the accessory coupling member may be stored in a memory of the electronic control unit and indexed according to the identification of the accessory coupling member. Regardless of the embodiment, it should be understood that the electronic control unit 202, 402 is able to discern the type of the accessory coupling member based on the identification of the accessory coupling member. Thereafter, the electronic control unit 202, 402 determines if different types of accessory coupling members are attached to respective lifting hooks 139A, 139B of the sling bar 136 and provides a warning signal, such as with the display 270, 470, the visual indicator 272, 472, and/or the audible indicator 274, 474, when accessory coupling members of different types are attached to the same lifting hook.

For example, accessory coupling member 620A may be a "right-type", accessory coupling member 622A may be a "right-type", accessory coupling member 620B may be a "left-type", and accessory coupling member 620A may be a "left-type". If the accessory coupling members attached to, for example, lifting hook 139A include a "right-type" and a "left-type" accessory coupling member, such as when accessory coupling member 620A and accessory coupling member 620B are both attached to lifting hook 139A, then the electronic control unit 202, 402 provides a warning signal with the display 270, 470, the visual indicator 272, and/or the audible indicator 274, 474 indicating that the accessory 600 is improperly attached to the sling bar 136.

In one embodiment, the electronic control unit 202, 402 may illuminate the visual indicator 272, 472 as red to indicate that the accessory 600 is improperly attached to the sling bar 136. In some embodiments, the electronic control unit 202 may lock-out the actuation controls of the person lifting device 100, 300 when accessory couplings of different types are attached to the same lifting hook to prevent the person lifting device from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when accessory couplings of different types are attached to the same lifting hook. In embodiments if accessory coupling members of the same type are attached to the same lifting hook, then the electronic control unit 202, 402 provides a signal, such as with the display 270, 470, the visual indicator 272, 472, and/or the audible indicator 274, 474. For example, in one embodiment, the electronic control unit 202, 402 may illuminate the visual indicator 272, 472 as green (or maintain the illumination as green) to indicate that accessory coupling members of the same type are attached to the same lifting hook. This process is then repeated for each of the lifting hooks 139A, 139B of the sling bar 136.

In addition to determining if the same "type" of accessory coupling members are attached to one lifting hook of the sling bar 136, the electronic control unit 202, 402 may also determine if the same number of accessory coupling members are attached to corresponding lifting hooks 139A, 139B on opposite ends of the sling bar 136. For example, the electronic control unit 202, 402 may determine how many accessory coupling members are attached to each of the lifting hooks 139A, 139B based on the identifications of the accessory coupling members transmitted by each of the coupling detectors 260A, 260B, 460A, 460B associated with the lifting hooks 139A, 139B. The electronic control unit 202, 402 may then compare the number of accessory coupling members attached to the first lifting hook 139A with the number of accessory coupling members attached to the second lifting hook 139B. When the electronic control unit determines that the number of accessory coupling members attached to the first lifting hook 139A is different than the number of accessory coupling members attached to the second lifting hook 139B, the electronic control unit 202, 402 provides a warning, such as with the display 270, 470, the visual indicator 272, 472, and/or the audible indicator 274, 474. For example, in one embodiment, the electronic control unit 202 may illuminate the visual indicator 272, 472 as red to indicate that the number of accessory coupling members attached to the first lifting hook 139A is different than the number of accessory coupling members attached to the second lifting hook 139B. In some embodiments, the electronic control unit 202 may lock-out the actuation controls of the person lifting device 100, 300 when the number of accessory coupling members attached to the first lifting hook 139A is different than the number of accessory coupling members attached to the second lifting hook 139B to prevent the person lifting device 100, 300 from being used until the controls are unlocked or an appropriate override code is entered. Similarly, in embodiments where the electronic control unit 402 of the scale assembly 400 is communicatively coupled to the electronic control unit 202 of the person lifting device 100, 300, the electronic control unit 402 may send a signal to the electronic control unit 202 to lock-out the actuation controls of the person lifting device 100, 300 when the number of accessory coupling members attached to the first lifting hook 139A is different than the number of accessory coupling members attached to the second lifting hook 139B.

In embodiments, if the number of accessory coupling members attached to the first lifting hook 139A is the same as the number of accessory coupling members attached to the second lifting hook 139B, then the electronic control unit 202, 402 provides a signal, such as with the display 270, 470, the visual indicator 272, 472, and/or the audible indicator 274, 474. For example, in one embodiment, the electronic control unit 202, 402 may illuminate the visual indicator 272, 472 as green (or maintain the illumination as green) to indicate that the number of accessory coupling members attached to the first lifting hook 139A is the same as the number of accessory coupling members attached to the second lifting hook 139B.

Based on the foregoing, it should be understood that the electronic control unit of the person lifting device and/or the scale assembly may be programmed to provide a warning signal with the display, the visual indicator, and/or the audible indicator to a caregiver operating the person lifting device under certain conditions. For example, the person lifting device and/or the scale assembly may provide a warning when non-compatible components (such as sling bars and accessories) are attached to the person lifting device, when an accessory is improperly attached to a sling bar, when the accessory has exceeded a predetermined maximum number of wash and/or load cycles, and/or when the accessory is not intended for use with a particular patient. Further, in embodiments, the scale assembly includes an upper coupling and a lower coupling that are positioned on recessed portions of the scale assembly such that the distance between the upper coupling and the lower coupling may be minimized. By minimizing the distance between the upper coupling and the lower coupling, the scale assembly may not significantly change the vertical operating range of the person lifting device when the scale assembly is coupled to the person lifting device.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A scale assembly comprising:
    an upper member comprising a first outer portion, a second outer portion, and a recessed portion offset from and positioned below the first outer portion and the second outer portion of the upper member;
    an upper coupling for coupling the scale assembly to a person lifting device, the upper coupling coupled to the recessed portion of the upper member;
    a lower member spaced apart from the upper member, the lower member comprising a first outer portion, a second outer portion, and a recessed portion offset from and positioned above the first outer portion and the second outer portion of the lower member;
    a lower coupling for coupling a sling bar to the scale assembly, the lower coupling coupled to the recessed portion of the lower member;
    a first force sensor coupled to the first outer portion of the upper member and the first outer portion of the lower member;
    a second force sensor coupled to the second outer portion of the upper member and the second outer portion of the lower member; and
    an electronic control unit communicatively coupled to the first force sensor, the electronic control unit comprising a processor and a computer readable and executable instruction set, which when executed by the processor detects a force applied to the scale assembly with the first force sensor.

2. The scale assembly of claim 1, further comprising an accessory detector coupled to one of the upper member and the lower member.

3. The scale assembly of claim 1, further comprising a coupling detector coupled to one of the upper member and the lower member.

4. The scale assembly of claim 3, wherein the coupling detector is communicatively coupled to the electronic control unit, and the computer readable and executable instruction set, when executed by the processor, also detects an identification of an accessory coupling member of an accessory attached to a lifting hook of a sling bar with the coupling detector.

5. The scale assembly of claim 2, wherein the accessory detector is communicatively coupled to the electronic control unit, and wherein the computer readable and executable instruction set, when executed by the processor, also detects an identity of an accessory coupled to the scale assembly.

6. A scale assembly system for use with a person lifting device, the system comprising:
    an upper member comprising a first outer portion, a second outer portion, and a recessed portion offset from and positioned below the first outer portion and the second outer portion of the upper member;
    a lower member detached and spaced apart from the upper member, the lower member comprising a first outer portion, a second outer portion and a recessed portion offset from and positioned above the first outer portion and the second outer portion of the lower member;
    a first force sensor coupled to the first outer portion of the upper member and the first outer portion of the lower member;
    a second force sensor coupled to the second outer portion of the upper member and the second outer portion of the lower member; and
    an electronic control unit communicatively coupled to the first force sensor, the electronic control unit comprising a processor and a computer readable and executable instruction set, which when executed by the processor detects a force applied to the scale assembly with the first force sensor.

7. The scale assembly of claim 6, further comprising an accessory detector communicatively coupled to the electronic control unit, wherein the computer readable and executable instruction set, when executed by the processor, also detects an identification of an accessory with the accessory detector.

8. The scale assembly of claim 6, further comprising a coupling detector communicatively coupled to the electronic control unit, wherein the computer readable and executable instruction set, when executed by the processor, also detects an identification of an accessory coupling member of an accessory attached to a lifting hook of a sling bar with the coupling detector.

9. The scale assembly of claim 8, wherein the computer readable and executable instruction set, when executed by the processor, also:
    compares the identification of the accessory coupling member with an array of one or more compatible accessory coupling members associated with the lifting hook of the sling bar automatically with the electronic control unit; and
    communicates a warning signal when the identification of the accessory coupling member is not in the array of one or more compatible accessory coupling members, automatically with the electronic control unit.

10. A scale assembly for a person lifting device, the scale assembly comprising:

an outer housing;

an upper member positioned at least partially within the outer housing, the upper member comprising an outer portion, and a recessed portion that is offset from and positioned below the outer portion of the upper member in a vertical direction;

a lower member positioned at least partially within the outer housing, wherein the lower member is detached and spaced apart from the upper member in the vertical direction, the lower member comprising an outer portion and a recessed portion that is offset from and positioned above the outer portion of the lower member in the vertical direction;

at least one force sensor positioned between the upper member and the lower member in the vertical direction, wherein the at least one force sensor is coupled to the outer portion of the upper member and the outer portion of the lower member;

a coupling detector; and an electronic control unit communicatively coupled to the at least one force sensor and the coupling detector, the electronic control unit comprising a processor and a computer readable and executable instruction set, which when executed by the processor:

detects a force applied to the scale assembly with the at least one force sensor; and detects an identification of an accessory coupling member of an accessory attached to a lifting hook of a sling bar with the coupling detector.

11. The scale assembly of claim 10, further comprising an upper coupling coupled to the recessed portion of the upper member.

12. The scale assembly of claim 11, wherein the upper coupling is positioned below the outer portion of the upper member in the vertical direction.

13. The scale assembly of claim 10, further comprising a lower coupling coupled to the recessed portion of the lower member.

14. The scale assembly of claim 13, wherein the lower coupling is positioned above the outer portion of the lower member in the vertical direction.

\* \* \* \* \*